(12) United States Patent
Kamiya

(10) Patent No.: US 7,627,884 B2
(45) Date of Patent: Dec. 1, 2009

(54) PROGRAM INFORMATION DISPLAY APPARATUS WITH PROGRAM SELECTION INPUT

(75) Inventor: Masahiro Kamiya, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 1145 days.

(21) Appl. No.: 10/431,373

(22) Filed: May 8, 2003

(65) Prior Publication Data

US 2003/0210350 A1    Nov. 13, 2003

(30) Foreign Application Priority Data

| May 8, 2002 | (JP) | ............................ 2002-132751 |
| Aug. 21, 2002 | (JP) | ............................ 2002-240940 |

(51) Int. Cl.
  *G06F 3/00*   (2006.01)
  *H04N 5/445*  (2006.01)
  *G06F 13/00*  (2006.01)

(52) U.S. Cl. ............................ 725/52; 725/40; 725/61; 715/700

(58) Field of Classification Search ............... 725/52, 725/40, 61; 715/700
See application file for complete search history.

(56) References Cited

U.S. PATENT DOCUMENTS

| 5,850,218 A * | 12/1998 | LaJoie et al. ..................... 725/45 |
| 6,166,778 A * | 12/2000 | Yamamoto et al. ........... 348/569 |
| 6,522,354 B1 * | 2/2003 | Kawamura et al. ........ 348/231.2 |
| 6,654,721 B2 * | 11/2003 | Handelman ................. 704/270 |
| 6,662,177 B1 * | 12/2003 | Martino et al. .................. 707/3 |
| 6,754,906 B1 * | 6/2004 | Finseth et al. ................. 725/45 |
| 7,055,167 B1 * | 5/2006 | Masters ......................... 725/39 |
| 7,546,621 B2 * | 6/2009 | LaJoie et al. ................... 725/39 |
| 2001/0025375 A1 * | 9/2001 | Ahmad et al. ................. 725/39 |
| 2002/0059602 A1 * | 5/2002 | Macrae et al. ................ 725/42 |
| 2005/0138656 A1 * | 6/2005 | Moore et al. .................. 725/45 |

FOREIGN PATENT DOCUMENTS

| JP | 09-083891 | * | 3/1997 |
| JP | A 9-83891 |   | 3/1997 |
| JP | 11-308549 |   | 11/1999 |
| JP | 2000-278624 |   | 10/2000 |
| JP | 2000-341593 |   | 12/2000 |
| JP | 2000-341598 |   | 12/2000 |
| JP | 2001-028719 |   | 1/2001 |
| JP | A 2001-24961 |   | 1/2001 |
| JP | 2001-036823 | * | 2/2001 |
| JP | 2001-054034 |   | 2/2001 |
| JP | A 2001-36823 |   | 2/2001 |
| JP | 2001-069416 |   | 3/2001 |
| JP | 2001-1555393 | * | 6/2001 |

* cited by examiner

*Primary Examiner*—Hoang-Vu A Nguyen-Ba
(74) *Attorney, Agent, or Firm*—Oliff & Berridge, PLC

(57) ABSTRACT

The disclosure relates to program information display apparatus including a program data receiving unit for receiving program data of digital broadcasting, and a program in-depth information creating unit for extracting in-depth information of a predetermined program from the program data received by the program data receiving unit, and creating program in-depth information thereof. The program information display apparatus is equipped with a program selection input unit for allowing a user to select and display in-depth information of one program when in-depth information of another program is being displayed, and a program in-depth information display changing unit for displaying program in-depth information of a program selected through the program selection input unit when the program is selected.

25 Claims, 14 Drawing Sheets

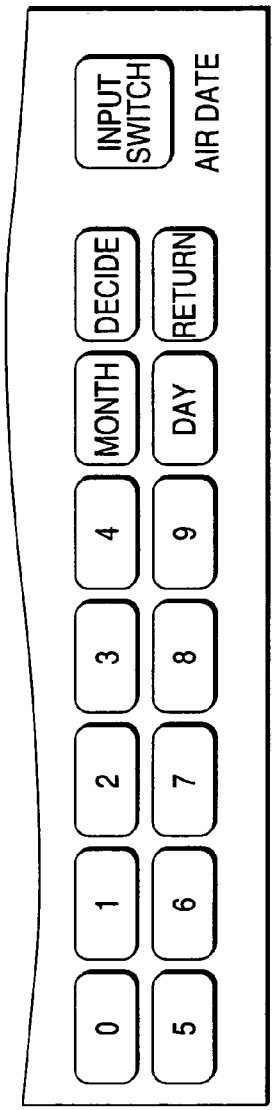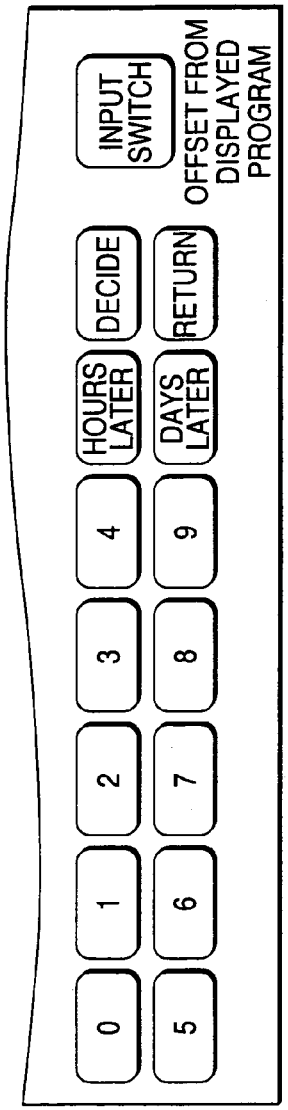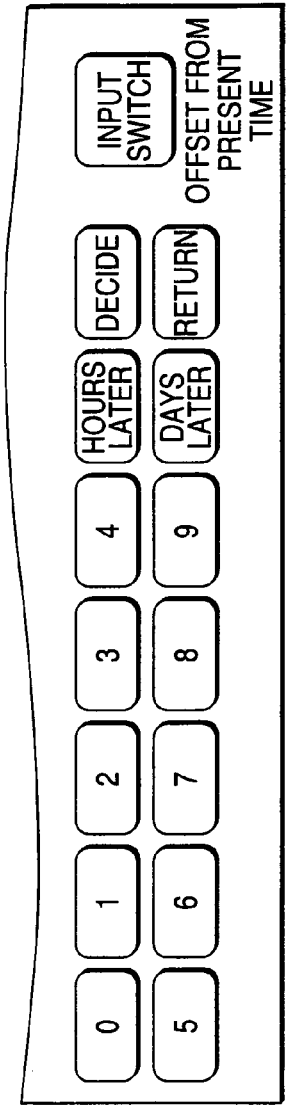

FIG. 11

| PROGRAM SELECTION OPERATION ITEMS | REGISTERED KEYWORDS |
|---|---|
| SERVICE BACKWARD ROTATION OPERATION | PREVIOUS SERVICE, ... |
| SERVICE FORWARD ROTATION OPERATION | NEXT SERVICE, ... |
| CHANNEL BACKWARD ROTATION OPERATION | PREVIOUS CHANNEL, ... |
| CHANNEL FORWARD ROTATION OPERATION | NEXT CHANNEL, ... |
| TIME BACKWARD ROTATION OPERATION | PREVIOUS PROGRAM, ... |
| TIME FORWARD ROTATION OPERATION | NEXT PROGRAM, ... |
| PREVIOUS DAY SET-BACK OPERATION | PREVIOUS DAY, LAST DAY, ... |
| NEXT DAY SET-FORTH OPERATION | NEXT DAY, FOLLOWING DAY, ... |
| PREVIOUS WEEK SET-BACK OPERATION | PREVIOUS WEEK, LAST WEEK, ... |
| NEXT WEEK SET-FORTH OPERATION | NEXT WEEK, FOLLOWING WEEK, ... |
| CURRENTLY RECEIVED PROGRAM SELECTION OPERATION | PROGRAM VIEWED NOW, ... |
| NEXT PROGRAM SELECTION OPERATION | NEXT TO PROGRAM VIEWED NOW, ... |
| RECORDING-PRESELECTED PROGRAM SELECTION OPERATION | RECORDING-PRESELECTED PROGRAM, ... |
| VIEWING-PRESELECTED PROGRAM SELECTION OPERATION | VIEWING-PRESELECTED PROGRAM, ... |
| SERVICE DIRECT SELECTION OPERATION | SERVICE ○○○ |
| CHANNEL DIRECT SELECTION OPERATION | CHANNEL ○○○ |
| AIR TIME DIRECT SELECTION OPERATION | AIR TIME ○ HOUR ○ MINUTE |
| OUT TIME DIRECT SELECTION OPERATION | OUT TIME ○ HOUR ○ MINUTE |
| AIR DATE DIRECT SELECTION OPERATION | AIR DATE ○ MONTH ○ DATE |
| PROGRAM OFFSET HOURS OPERATION | ○ HOURS LATER THAN THIS PROGRAM |
| PROGRAM OFFSET DAYS OPERATION | ○ DAYS LATER THAN THIS PROGRAM |
| TIME OFFSET HOURS OPERATION | ○ HOURS LATER FROM NOW ON |
| TIME OFFSET DAYS OPERATION | ○ DAYS LATER FROM NOW ON |
| | |

FIG. 12

| CATEGORIES | REGISTERED WORDS |
|---|---|
| PROGRAM SELECTION CATEGORY | SERVICE |
| | CHANNEL |
| | RECORDING |
| | VIEWING |
| | START |
| | END |
| | PROGRAM |
| | RESERVATION |
| | BROADCASTING |
| | ... |
| DIGIT CATEGORY | 1 |
| | 2 |
| | 3 |
| | ... |
| UNIT CATEGORY | WEEK |
| | DAY |
| | HOUR |
| | MINUTE |
| | DATE AND HOUR |
| | HOURS LATER |
| | MINUTES LATER |
| | ... |
| OTHER-PURPOSE CATEGORY | PREVIOUS |
| | NEXT |
| | VIEWING NOW |
| | THIS PROGRAM |
| | FROM NOW ON |
| | ... |
| | |

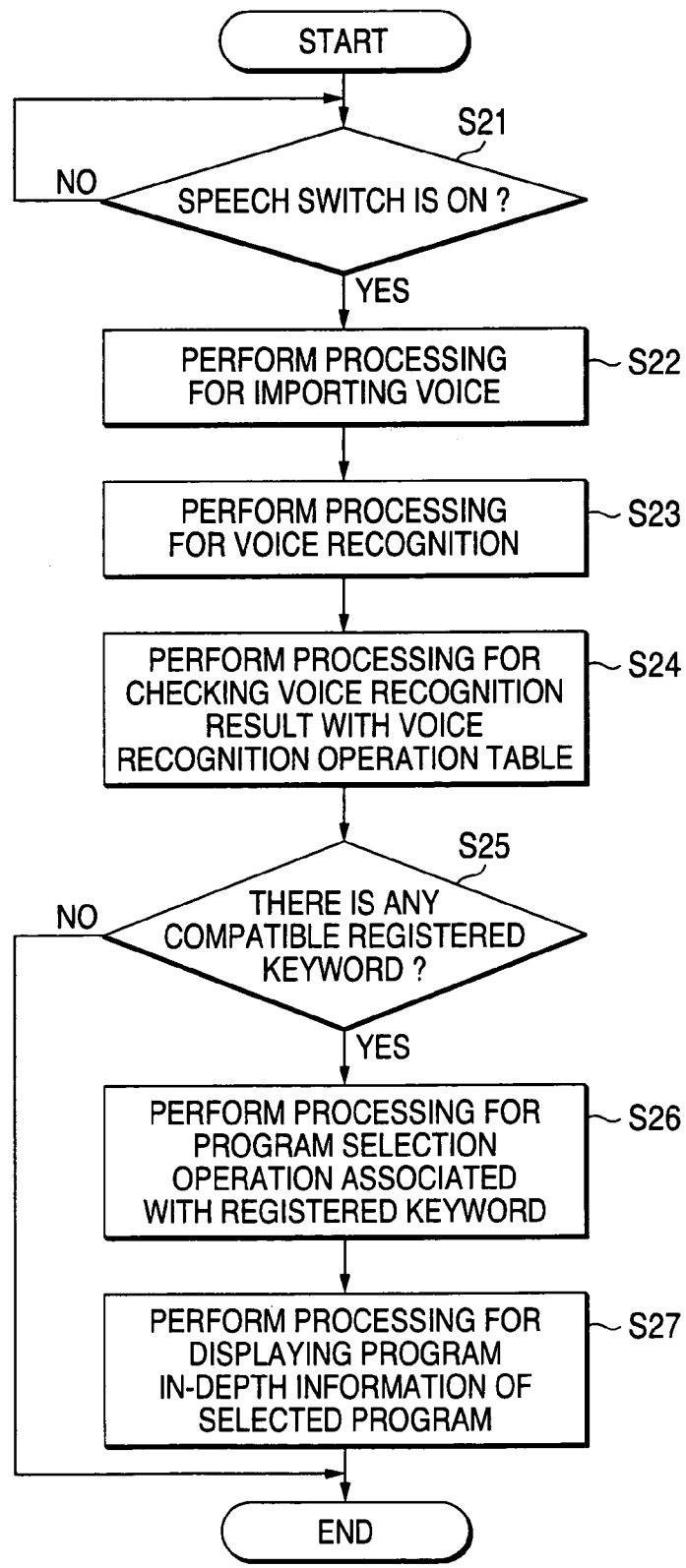

PROGRAM INFORMATION DISPLAY APPARATUS WITH PROGRAM SELECTION INPUT

CROSS-REFERENCE TO RELATED APPLICATIONS

The present disclosure relates to the subject matter contained in Japanese Patent Application No. 2002-132751 filed on May 8, 2002 and Japanese Patent Application No. 2002-240940 filed on Aug. 21, 2002, which are incorporated herein by reference in its entirety.

BACKGROUND

1. Field of the Invention

The present invention relates to a program information display apparatus, and more particularly relates to a program information display apparatus for receiving program data of digital broadcasting and displaying program in-depth information created on the basis of the received program data.

2. Description of the Related Art

Heretofore, a program of TV broadcasting has been selected with reference to the program contents (program name, summary or cast) shown in the program guide of a newspaper or a TV program magazine. Recently, along with the popularization of data broadcasting of digital broadcasting or the Internet, program data has been provided from broadcasting stations. In concert therewith, program information display apparatus for creating a program guide called EPG (Electronic Program Guide) based on the program data and displaying the created program guide on a screen has been included in TV sets or digital broadcasting receivers.

A typical program guide created by such a program information display apparatus has a configuration similar to that of a program guide in a newspaper or a TV program magazine, including information such as a broadcasting station name, a channel number, a program name, an air time, an out time, etc. By use of the displayed program guide and a remote controller, a user can also do setting such as selection of a program to be viewed or programming the timer.

In addition, the program information display apparatus is equipped with functions capable of creating program information in various forms as well as the function of creating a typical program guide using program data. One of those functions is a function of creating and displaying program in-depth information for each program shown in the program guide.

The program in-depth information can be displayed via the program guide in the program information display apparatus in the related art. First, when a user pushes an EPG button provided in the remote controller and for displaying the program guide, the program guide is displayed on the screen.

The user operates the remote controller to scroll the program guide and select a program whose program in-depth information should be displayed. Then, as soon as the user pushes a program detail button for displaying the program in-depth information, the screen is changed over from the program guide to a program in-depth information screen. Through this screen display, the user can view the program in-depth information (a broadcasting channel, a service number, a program name, an air time, an out time, a program category, cast, program contents, etc.) of the selected program.

Then, when the user wants to see the program in-depth information of another program after checking the displayed program in-depth information, the user makes a predetermined operation on the remote controller so as to display the program guide again, scroll the program guide and select a program whose program in-depth information should be displayed. Then, when the user pushes the program detail button, the program in-depth information of the other program can be displayed.

To display the program in-depth information of a further other program, an operation similar to the aforementioned operation is carried out to return once from the program in-depth information screen to the program guide screen. Next, a program whose program in-depth information should be displayed is selected, and the program detail button is pushed. If such an operation is repeated, the program in-depth information of a further other program can be displayed.

As described above, according to the program information display apparatus in the related art, the user has to return the display to the program guide screen whenever the user wants to change over the display from the program in-depth information of one program to the program in-depth information of another program. Therefore, an operation of switching to the program guide screen, an operation of scrolling for selecting a desired program on the program guide screen, and other operations, are required. Thus, there is a problem that it takes a lot of labor for carrying out an operation of selecting a program, and the program in-depth information cannot be displayed easily with a reduced number of operations.

SUMMARY

The invention is developed in consideration of the foregoing problem. An object of the invention is to provide program information display apparatus which can display program in-depth information easily with a reduced number of operations.

In order to achieve the object, according to the invention, there is provided program information display apparatus (1) including a program data receiving unit, a program in-depth information creating unit, a program selection input unit, and a program in-depth information display changing unit. The program data receiving unit receives program data of digital broadcasting. The program in-depth information creating unit extracts a predetermined information from the program data received by the program data receiving unit to create program in-depth information. The program selection input unit allows a user to select the program in-depth information of one program while displaying the program in-depth information of another program. The program in-depth information display changing unit displays the program in-depth information of the one program when the one program is selected through the program selection input unit.

According to the program information display apparatus (1), by use of the program selection input unit, the user can select a program, whose program in-depth information should be displayed, with a reduced number of operations, and display the program in-depth information of the selected program easily. Thus, the operating property can be improved.

Further, according to an embodiment of the invention, in a program information display apparatus (2) having the configuration of the program information display apparatus (1), the program selection input unit includes a service selection input unit for allowing the user to select a program in a service adjacent to a service having the other program when one channel includes a plurality of services for programs.

According to the program information display apparatus (2), a program in a service adjacent to a service having a program whose program in-depth information is being displayed currently can be selected with a single input operation. Thus, the program in-depth information of the program in the adjacent service can be displayed easily with a reduced number of operations.

Further, according to an embodiment of the invention, in a program information display apparatus (3) having the configuration of the program information display apparatus (1) or (2), the program selection input unit includes a channel selection input unit for allowing the user to select a program on a channel adjacent to a channel having the another program.

According to the program information display apparatus (3), a program on a channel adjacent to a channel having a program whose program in-depth information is being displayed currently can be selected with a single input operation. Thus, the program in-depth information of the program on the adjacent channel can be displayed easily with a reduced number of operations.

Further, according to an embodiment of the invention, in a program information display apparatus (4) having the configuration of any one of the program information display apparatuses (1) to (3), the program selection input unit includes at least one of a previous time selection input unit for allowing the user to select a program in a previous time of the other program, and a following time selection input unit for allowing the user to select a program in a following time of the other program.

According to the program information display apparatus (4), a program in the temporal vicinity of a program whose program in-depth information is being displayed currently can be selected with a single input operation. Thus, the program in-depth information of the program in the temporal vicinity can be displayed easily with a reduced number of operations.

Further, according to an embodiment of the invention, in a program information display apparatus (5) having the configuration of any one of the program information display apparatuses (1) to (4), the program selection input unit includes at least one of a previous-day program selection input unit for allowing the user to select a program the same in time slot as the another program, but on air on a previous day, and a next-day program selection input unit for allowing the user to select a program the same in time slot as the another program, but on air on a next day.

According to the program information display apparatus (5), a program the same in time slot as a program whose program in-depth information is being displayed currently but on air on the previous day or on the next day can be selected with a single input operation. Thus, the program in-depth information of the program in the same time slot on the previous day or on the next day can be displayed easily with a reduced number of operations.

Further, according to an embodiment of the invention, in a program information display apparatus (6) having the configuration of any one of the program information display apparatuses (1) to (5), the program selection input unit includes at least one of a previous week program selection input unit for allowing the user to select a program the same in time slot as the other program, but on air in a previous week, and a next week program selection input unit for allowing the user to select a program the same in time slot as the other program, but on air in a next week.

According to the program information display apparatus (6), a program the same in time slot as a program whose program in-depth information is being displayed currently but on air in the previous week or in the next week can be selected with a single input operation. Thus, the program in-depth information of the program in the same time slot in the previous week or in the next week can be displayed easily with a reduced number of operations.

Further, according to an embodiment of the invention, in a program information display apparatus (7) having the configuration of any one of the program information display apparatuses (1) to (6), the program selection input unit includes a received program selection input unit for allowing the user to select the other program.

According to the program information display apparatus (7), a program which is being received currently can be selected with a single input operation. Thus, the program in-depth information of the program which is being received currently can be displayed easily with a reduced number of operations.

Further, according to an embodiment of the invention, in a program information display apparatus (8) having the configuration of any one of the program information display apparatuses (1) to (7), the program selection input unit includes a next program selection input unit for allowing the user to select a program following the another program.

According to the program information display apparatus (8), a program following a program which is being received currently can be selected with a single input operation. Thus, the program in-depth information of the program following the program which is being received currently can be displayed easily with a reduced number of operations.

Further, according to an embodiment of the invention, in a program information display apparatus (9) having the configuration of any one of the program information display apparatuses (1) to (8), the program selection input unit includes a recording-preselected program selection input unit for allowing the user to select a recording-preselected program.

According to the program information display apparatus (9), a recording-preselected program can be selected with a single input operation. Thus, the program in-depth information of the recording-preselected program can be displayed easily with a reduced number of operations.

Further, according to an embodiment of the invention, in a program information display apparatus (10) having the configuration of any one of the program information display apparatuses (1) to (9), the program selection input unit includes a viewing-preselected program selection input unit for allowing the user to select a viewing-preselected program.

According to the program information display apparatus (10), a viewing-preselected program can be selected with a single input operation. Thus, the program in-depth information of the viewing-preselected program can be displayed easily with a reduced number of operations.

Further, according to an embodiment of the invention, in a program information display apparatus (11) having the configuration of the program information display apparatus (9), the recording-preselected program selection input unit can change the selected recording-preselected program from among a plurality of recording-preselected programs in order of preselection date and time.

According to the program information display apparatus (11), any one of recording-preselected programs whose program in-depth information is desired by the user to display can be searched easily in the descending order of preselection date and time.

Further, according to an embodiment of the invention, in a program information display apparatus (12) having the configuration of the program information display apparatus (10), the viewing-preselected program selection input unit can change the selected viewing-preselected program from among a plurality of viewing-preselected programs in order of preselection date and time.

According to the program information display apparatus (12), any one of viewing-preselected programs whose program in-depth information is desired by the user to display can be searched easily in the descending order of preselection date and time.

Further, according to an embodiment of the invention, in a program information display apparatus (13) having the configuration of any one of the program information display apparatuses (1) to (12), the program selection input unit includes a program specific information input screen changeover unit for changing over to a screen for allowing the user to input program specific information.

According to the program information display apparatus (13), the screen can be switched to a screen for allowing the user to input the program specific information, with a reduced number of operations. Even in the case where the number of times of switching to select a desired program increases, the program can be specified through the screen with a reduced number of input operations. Thus, the program in-depth information of the specified program can be displayed more easily.

Further, according to an embodiment of the invention, in a program information display apparatus (14) having the configuration of the program information display apparatus (13), the program specific information input screen changeover unit can change over acceptable pieces of the program specific information in turn.

According to the program information display apparatus (14), acceptable pieces of the program specific information can be changed over in turn. Thus, a screen for allowing the user to input a desired piece of program in-depth information can be displayed with an easy operation.

Further, according to an embodiment of the invention, in a program information display apparatus (15) having the configuration of the program information display apparatus (13), the program specific information input screen changeover unit can display a list of acceptable pieces of the program specific information.

According to the program information display apparatus (15), a list of acceptable pieces of the program specific information can be displayed. Thus, it becomes easier to select a screen for allowing the user to input a desired piece of program in-depth information.

Incidentally, the program specific information may include a service number, a channel number, an air time, an out time and an air date.

When the program specific information includes the service number, the user can input the service number directly for the service selection through the program selection input unit. Thus, even when the number of times of switching for a desired service increases, the program in the desired service can be specified by the direct input of the service number. It is therefore possible to display the program in-depth information of the desired program more easily with a reduced number of input operations.

When the program specific information includes the channel number, the user can input the channel number directly for the channel selection through the program selection input unit. Thus, even when the number of times of switching for a desired channel increases, the program on the desired channel can be specified by the direct input of the channel number. It is therefore possible to display the program in-depth information of the desired program more easily with a reduced number of input operations.

When the program specific information includes the air time, the user can input the air time directly for the time selection through the program selection input unit. Thus, even when the number of times of switching for a desired program among programs in the temporal vicinity of the air time increases, the desired program can be specified by the direct input of the air time. It is therefore possible to display the program in-depth information of the desired program more easily with a reduced number of input operations.

When the program specific information includes the out time, the user can input the out time directly for the time selection through the program selection input unit. Thus, even when the number of times of switching for a desired program among programs in the temporal vicinity of the out time increases, the desired program can be specified by the direct input of the out time. It is therefore possible to display the program in-depth information of the desired program more easily with a reduced number of input operations.

When the program specific information includes the air date, the user can input the air date directly for the previous-day/next-day program selection through the program selection input unit. Thus, even when the number of times of switching for the air date increases, the desired program can be specified by the direct input of the air date. It is therefore possible to display the program in-depth information of the desired program more easily with a reduced number of input operations.

Further, according to an embodiment of the invention, in a program information display apparatus (16) having the configuration of any one of the program information display apparatuses (13) to (15), the program specific information includes at least one of offset hours and offset days from an air time of the another program.

According to the program information display apparatus (16), the user can input the offset hours or the offset days directly for the time selection through the program selection input unit. Thus, even when the number of times of switching for an aimed air time from the program whose program in-depth information is being displayed currently increases, the desired program can be specified by the direct input of the offset hours or the offset days. It is therefore possible to display the program in-depth information of the desired program more easily with a reduced number of input operations.

Further, according to an embodiment of the invention, in a program information display apparatus (17) having the configuration of any one of the program information display apparatuses (13) to (15), the program specific information includes at least one of offset hours and offset days from a present time.

According to the program information display apparatus (17), the user can input the offset hours or the offset days directly for the time selection through the program selection input unit. Thus, even when the number of times of switching for an aimed air time from the present time increases, a desired program can be specified by the direct input of the offset hours or the offset days. It is therefore possible to display the program in-depth information of the desired program more easily with a reduced number of input operations.

Further, according to an embodiment of the invention, in a program information display apparatus (18) having the configuration of any one of the program information display apparatuses (1) to (10), the program selection input unit includes a voice recognition unit, and a program corresponding to program specific information recognized by the voice recognition unit is selected as the one program.

According to the program information display apparatus (18), program specific information input by voice is voice-recognized by the voice recognition unit. Thus, during the display of the program in-depth information of one program, another program whose program in-depth information should be displayed can be selected easily on the basis of the input voice. As a result, the user can display the program in-depth information of the other program without using any operation of buttons or the like. Thus, the operating property can be more improved.

Further, according to an embodiment of the invention, in a program information display apparatus (19) having the configuration of the program information display apparatus (18), the program specific information includes a keyword.

According to the program information display apparatus (19), the keyword can be input by voice. As a result, the program in-depth information of a program associated with the keyword can be displayed directly without any operation of buttons or the like. Thus, the user-friendliness can be more improved.

Further, according to an embodiment of the invention, in a program information display apparatus (20) having the configuration of the program information display apparatus (18), the program specific information includes a service number.

According to the program information display apparatus (20), the service number can be input by voice. As a result, the program in-depth information of a program corresponding to the service number can be displayed directly without any operation of buttons or the like. Thus, the user-friendliness can be more improved.

Further, according to an embodiment of the invention, in a program information display apparatus (21) having the configuration of the program information display apparatus (18), the program specific information includes a channel number.

According to the program information display apparatus (21), the channel number can be input by voice. As a result, the program in-depth information of a program corresponding to the channel number can be displayed directly without any operation of buttons or the like. Thus, the user-friendliness can be more improved.

Further, according to an embodiment of the invention, in a program information display apparatus (22) having the configuration of the program information display apparatus (18), the program specific information includes on-air date and time information.

According to the program information display apparatus (22), the air date and time information such as an air time, an out time and an air date can be input by voice. As a result, the program in-depth information of a program corresponding to the air date and time information can be displayed directly without any operation of buttons or the like. Thus, the user-friendliness can be more improved.

Further, according to an embodiment of the invention, in a program information display apparatus (23) having the configuration of the program information display apparatus (18), the program specific information includes at least one of offset hours and offset days from an air time of the another program.

According to the program information display apparatus (23), the offset hours or the offset days from the air time of the program whose program in-depth information is being displayed currently can be input by voice. As a result, the program in-depth information of a program to be broadcast after the offset hours or the offset days can be displayed directly without any operation of buttons or the like. Thus, the user-friendliness can be more improved.

Further, according to an embodiment of the invention, in a program information display apparatus (24) having the configuration of the program information display apparatus (18), the program specific information includes at least one of offset hours and offset days from a present time.

According to the program information display apparatus (24), the offset hours or the offset days from the present time can be input by voice. As a result, the program in-depth information of a program to be broadcast after the offset hours or the offset days can be displayed directly without any operation of buttons or the like. Thus, the user-friendliness can be more improved.

BRIEF DESCRIPTION OF THE DRAWINGS

FIGS. 7A-7E are explanatory views showing display examples of program specific information input changeover screens displayed on a lower area of the display.

FIG. 11 is a table showing an example of the data structure of a voice recognition operation table stored in a ROM.

FIG. 12 is a table showing an example of the data structure of a word dictionary table stored in the ROM.

FIG. 13 is a flow chart showing the display processing operation to be executed by a CPU of the program information display apparatus according to Embodiment

DETAILED DESCRIPTION OF EMBODIMENTS

Figure 1:
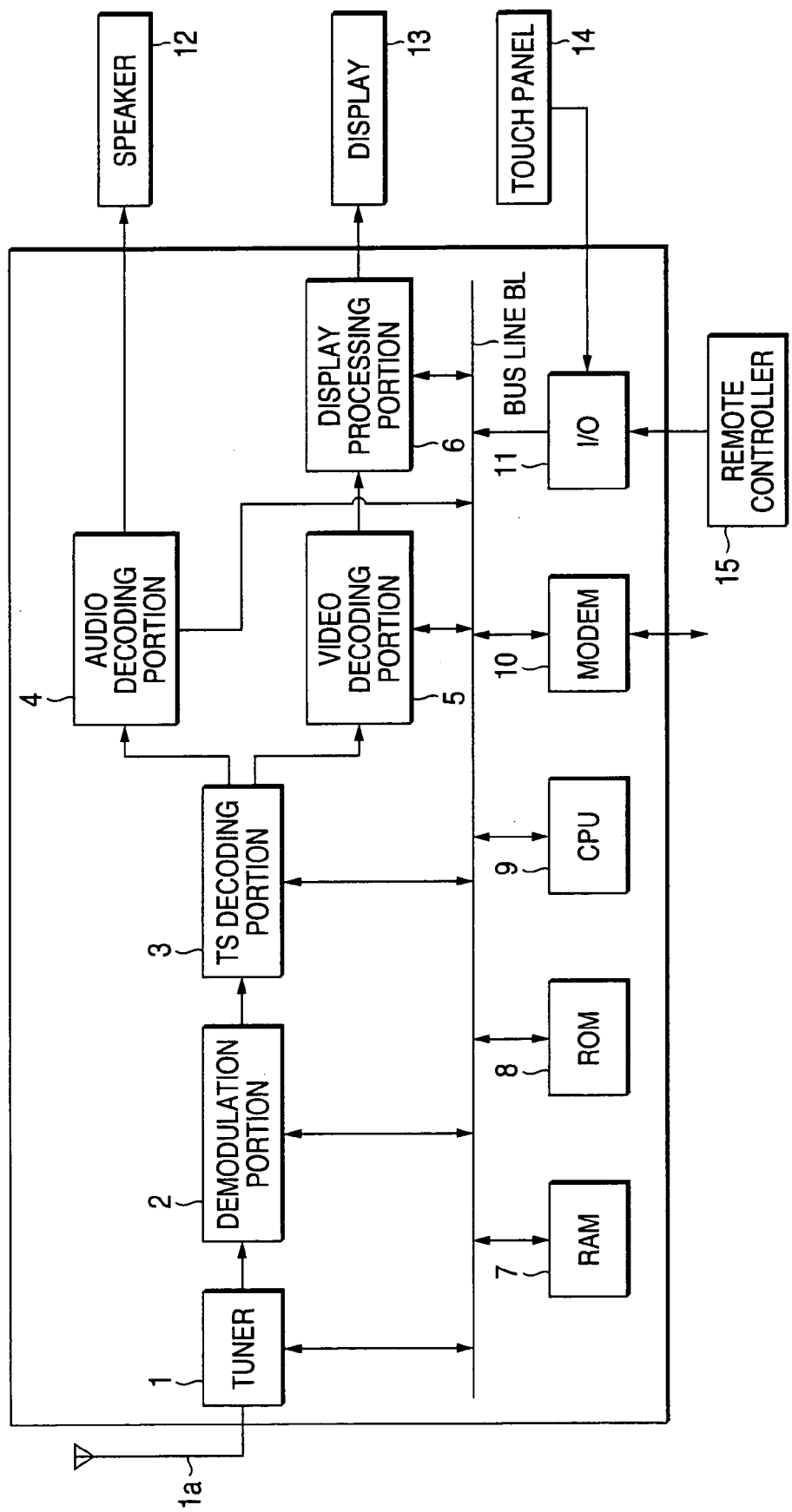
FIG. 1 is a block diagram schematically showing the main portion of a digital broadcasting receiver including program information display apparatus according to Embodiment (1) of the invention.

Embodiments of program information display apparatus according to embodiments of the invention will be described below with reference to the drawings. FIG. 1 is a block diagram schematically showing the main portion of an in-vehicle digital broadcasting receiver including a program information display apparatus according to an embodiment (1).

A tuner 1 tunes a reception radio wave received by an antenna 1a to a broadcast wave desired by a user, and amplifies the tuned reception radio wave. The tuner 1 includes a high-frequency amplification circuit, a tuning circuit, and so on. A demodulation portion 2 demodulates the reception wave tuned by the tuner 1, and outputs a digital signal. For example, in the case of digital TV broadcasting, the demodulation portion 2 includes an OFDM (Orthogonal Frequency Division Multiplexing) demodulation circuit for OFDM-demodulating an OFDM-modulated broadcast wave.

A TS (Transport Stream) decoding portion 3 decodes the OFDM-demodulated digital signal. That is, by the TS decoding portion 3, the digital signal subjected to transmission error prevention processing, compression processing, merging processing and so on before modulation in the broadcasting station is restored to its original digital signal. The TS decoding portion 3 is constituted by a logic circuit, a digital signal processor, or the like. Then, the digital signal decoded by the TS decoding portion 3 is supplied to an audio decoding portion 4, a video decoding portion 5 and a microcomputer (a bus line BL for data transmission), respectively, as audio data, video data, and various processing/control data. In addition, EPG data (program data) included in the broadcast signal is supplied to the data transmission bus line BL.

The audio decoding portion 4 decodes the audio data from the TS decoding portion 3. That is, the audio decoding portion 4 performs digital processing such as data error restoration processing, expanding processing and so on corresponding to the transmission error prevention processing, the compression processing and so on performed on the audio data, so as to restore the audio data to its original audio data. The audio decoding portion 4 includes a logic circuit, a digital signal processor or the like. Digital-to-analog conversion and power amplification (not shown) are performed on an audio signal output from the audio decoding portion 4. The audio signal is supplied as audio from a speaker 12.

The video decoding portion 5 decodes the video data from the TS decoding portion 3. That is, the video decoding portion 5 performs digital processing such as data error restoration processing, expanding processing and so on corresponding to the transmission error prevention processing, the compression processing and so on performed on the video data, so as to restore the video data to its original video data. The video decoding portion 5 includes a logic circuit, a digital signal processor or the like.

In the display processing portion 6, processing such as image quality control or combining/switching processing with another image (EPG or the like) is performed on a video signal output from the video decoding portion 5. The video signal is supplied to a display 13 constituted by a liquid crystal display unit or the like.

A VRAM (not shown) is included in the display processing portion 6. The video signal is supplied to the display 13 on the basis of data written in the VRAM. That is, when the data to be written in the VRAM is formed into desired data, a desired image can be displayed on the display 13.

The microcomputer controls the operation of each portion of the digital broadcasting receiver. The microcomputer includes a central processing unit (CPU) 9 for performing processing, a ROM 8 for storing programs and various pieces of data, a RAM 7 for temporarily storing various pieces of data, etc.

Of program data receivable from all the broadcasting stations, program data (including program in-depth information) of at least two weeks in the future reckoned from the present day is designed to be stored in the RAM 7. In addition, even when the power is turned off, backup power is supplied to the RAM 7 so as to maintain the data.

Incidentally, when the program data (including program in-depth information) of all the broadcasting stations is included in the EPG data of a reception channel, the data is stored in the RAM 7. On the other hand, when the program data (including program in-depth information) of all the broadcasting stations is not included in the EPG data of the reception channel, all the receivable channels are scanned so that program data is acquired from each channel and stored in the RAM 7 (hereinafter referred to as "accumulation processing". This accumulation processing may be performed manually at user's will, or may be performed automatically when the user does not view (when the power is OFF). Incidentally, when the accumulation processing is performed automatically, it will go well if the accumulation processing is performed after the time (for example, 0 a.m.) when the program data is updated all at once.

Then, the respective constituent portions of the digital broadcasting receiver are connected through the bus line BL so as to be able to transmit data to one another. A modem 10 is connected to the bus line BL so that the digital broadcasting receiver can also obtain program data by communication with the outside, for example, by communication with a digital TV station, or from contents on the Internet.

Further, an input and output interface (I/O) 11 is connected to the bus line BL so as to be able to make a connection with external equipment. For example, data is imported from a remote controller 15 using infrared light or the like so that an operation corresponding to the data is carried out. Alternatively, an input signal is imported from a touch panel 14 provided on the display 13 so that an operation corresponding to the input signal is carried out. Thus, the user can operate the touch panel 14 or the remote controller 15 so as to make the digital broadcasting receiver perform a desired operation.

Next, the method for displaying program in-depth information to be displayed on the display 13 will be described based on display examples shown in FIGS. 2 to 8.

Figure 2:
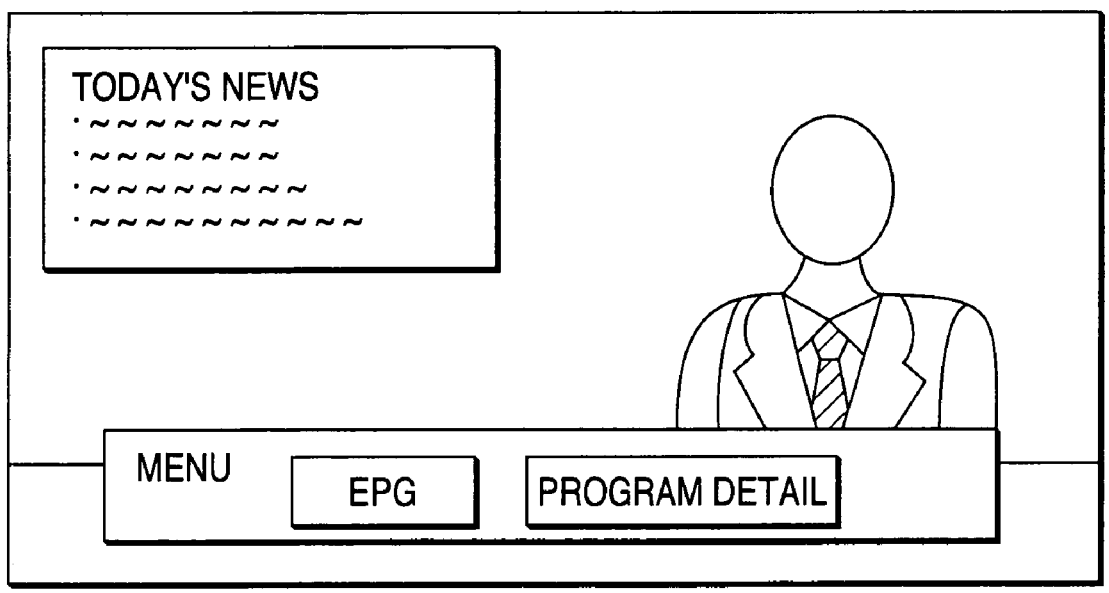
FIG. 2 is an explanatory view showing a display example of a menu displayed on a display.

When a predetermined input signal from the touch panel 14 is detected during the video display of a received program, a menu including an "EPG" button and a "program detail" button is displayed on the video image of the received program as shown in FIG. 2. The "EPG" button is a button for displaying a program guide which will be described later. The "program detail" button is a button for displaying the program in-depth information of the received program, and so on. For example, the menu is designed to be displayed for about 5 seconds, and to disappear if there is no operation on either button during the 5 seconds.

Figure 3:
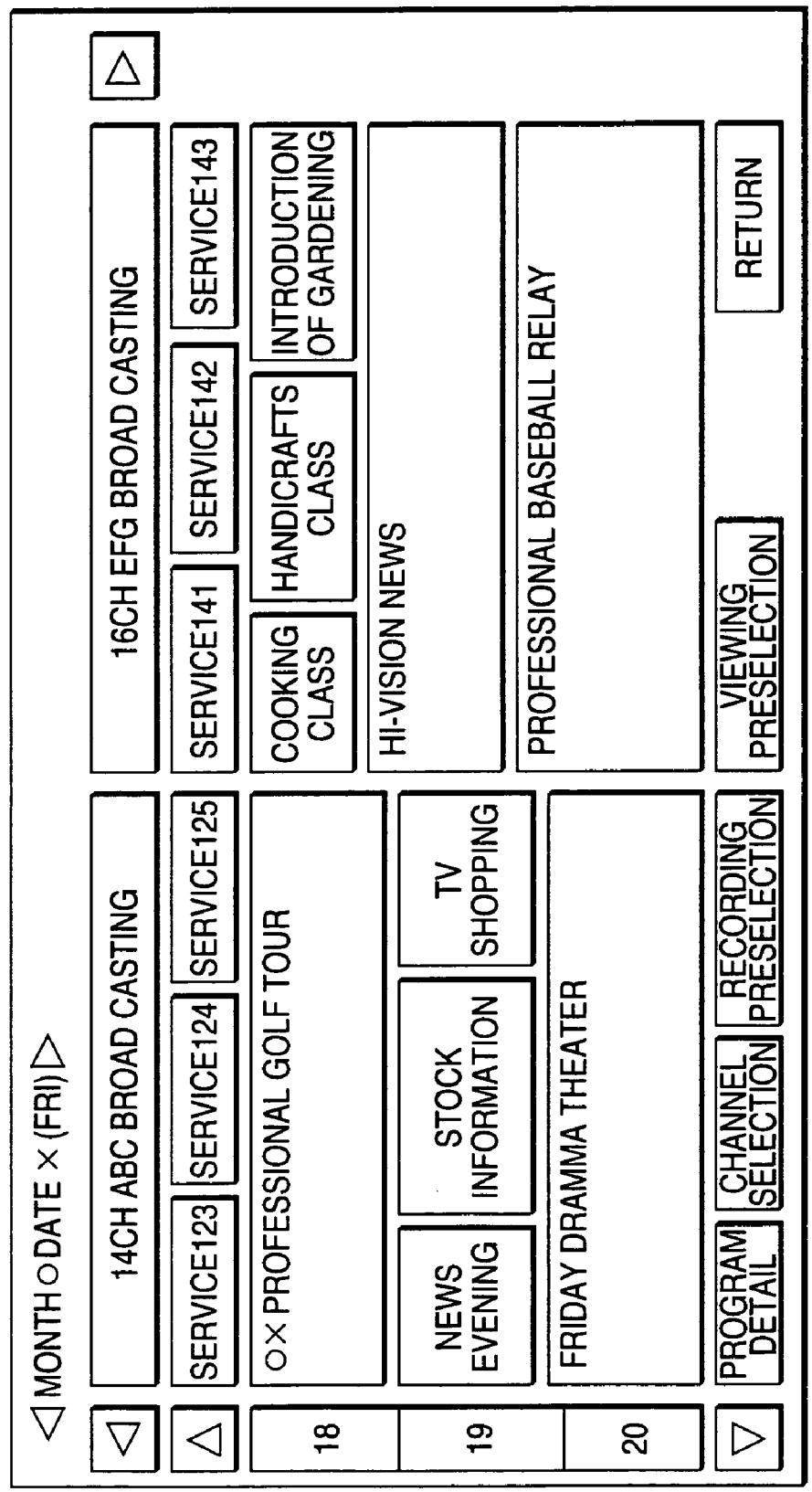
FIG. 3 is an explanatory view showing a display example of a program guide displayed on the display.

When the "EPG" button is pushed during the display of the menu shown in FIG. 2, the screen is switched to a program guide screen shown in FIG. 3. The date, the channel number and the broadcasting station name are displayed at the top of the program guide, and the time slots are displayed at the left end. In the case of digital TV broadcasting, a plurality of programs of services can be broadcast on each channel. In this embodiment, each channel can include up to three programs of services. Then, in the program space belonging to each service, a program name corresponding to the program space is displayed.

In addition, a "program detail" button, a "channel selection" button, a "recording preselection" button, a "viewing preselection" button and a "return" button for returning to the initial screen are displayed in the program guide shown in FIG. 3. Each button can be operated through the touch panel 14 for displaying the program in-depth information, selecting a channel for a program to be viewed from now on, making preselection of a program to be recorded, or making preselection of a program to be viewed. In addition, the remote controller 15 may be equipped with buttons having similar functions. Incidentally, the "viewing preselection" button is a button for making preselection of a program to be viewed by the user. The viewing-preselected program will be automatically received at the air time of the program and presented to the user.

In the program guide shown in FIG. 3, for example, the program "News Evening" is selected by means of the operation of cursor keys provided in the touch panel 14 or the remote controller 15, and the "program detail" button is pushed through the touch panel 14 or the remote controller 15. When the input of the "program detail" button is detected, a screen including the program in-depth information shown in FIG. 4 is next displayed.

Figure 4:
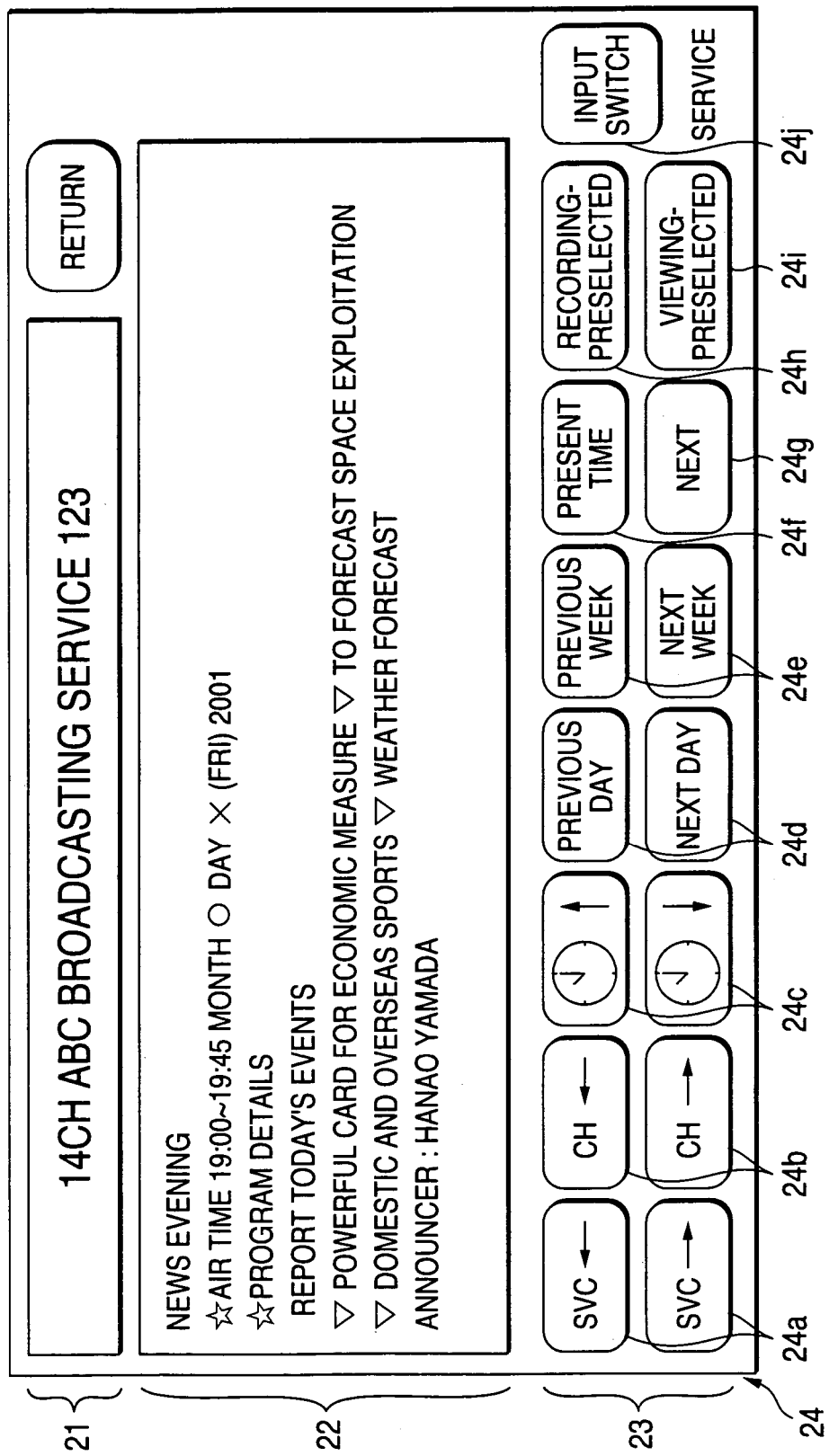
FIG. 4 is an explanatory view showing a display example of program in-depth information displayed on the display.

The channel number, the broadcasting station name and the service number of the program selected on the program guide shown in FIG. 3 are displayed on an upper area 21 of the display screen shown in FIG. 4. The program information including the program title, the air date and time, the program contents, the cast and so on is displayed on a central area 22. Program selection buttons 24 for allowing the user to select a program whose program in-depth information should be displayed are displayed on a lower area 23.

The program selection buttons 24 include service selection buttons 24a, channel selection buttons 24b, time selection buttons 24c, previous-day/next-day program selection buttons 24d, previous-week/next-week program selection buttons 24e, a received program selection button 24f, a next program selection button 24g, a recording-preselected program selection button 24h, a viewing-preselected program selection button 24i and a program specific information input changeover button 24j.

Figure 5:
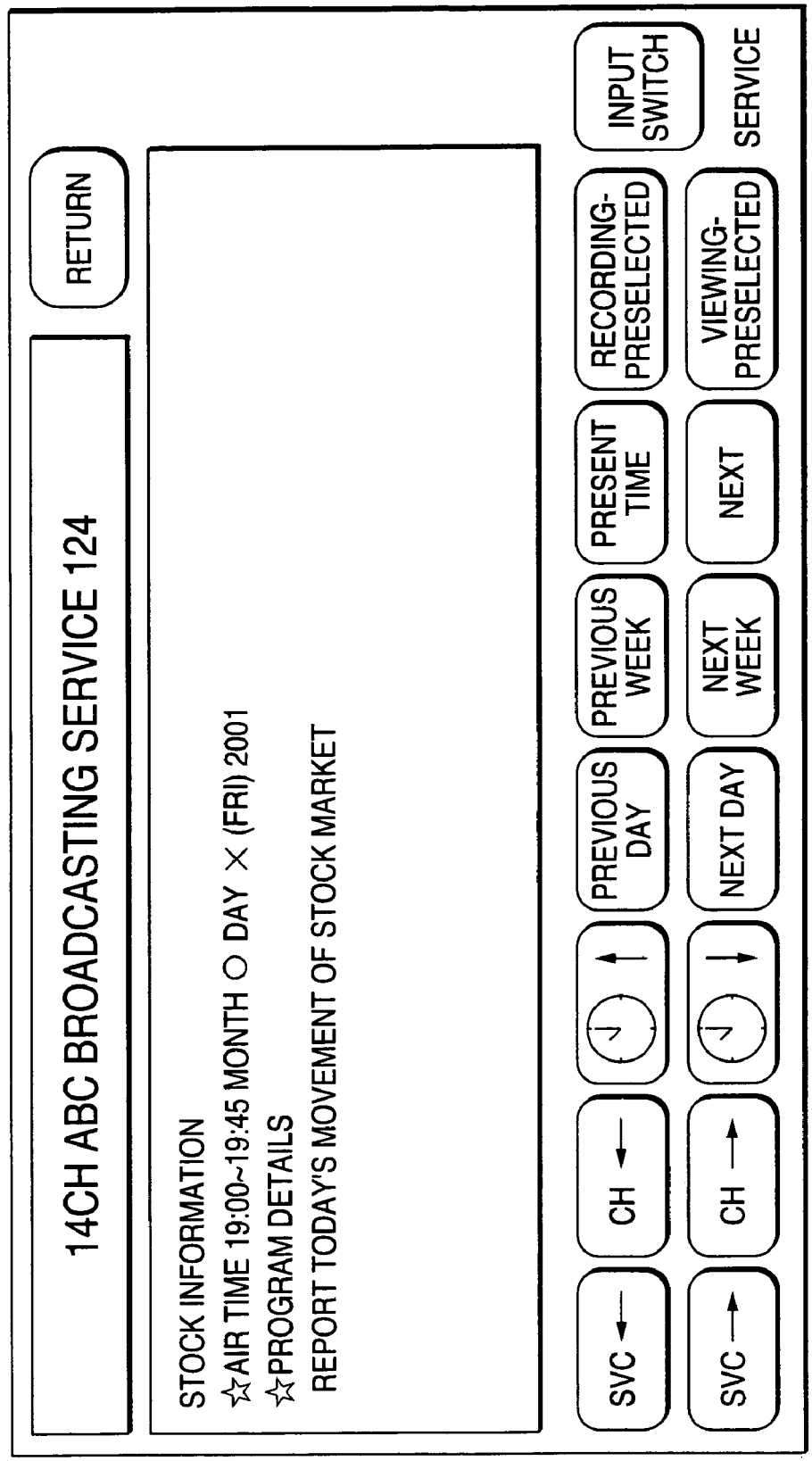
FIG. 5 is an explanatory view showing a display example of program in-depth information displayed on the display.

Each service selection button ("svc→", "svc←") 24a allows the user to select a program in a service adjacent to the service having the program whose program in-depth information is being displayed currently. For example, when the "svc→" button is pushed on the screen shown in FIG. 4, the respective portions in the upper area 21 and the central area 22 are switched to the program in-depth information of the program "Stock Information" in Service 124 as shown in FIG. 5 so that the program in-depth information of the program "Stock Information" in Service 124 is displayed. On the other hand, when the "svc←" button is pushed, the portions are switched to the program in-depth information of a program of a service on a channel on the left side of Channel 14 in the program guide shown in FIG. 3 so that the program in-depth information of the program on the channel on the left side of Channel 14 is displayed.

When there are a plurality of programs in the time slot of the program whose program in-depth information is being displayed currently, one of those programs is selected on the basis of a predetermined method of selection. For example, when the "svc→" button is pushed in the state where the program in-depth information of the program "TV Shopping" of Service 125 in the program guide shown in FIG. 3 is being displayed, the adjacent Service 141 has the programs "Hi-Vision News" and "Professional Baseball Relay" in the time slot of the program "TV Shopping". In this case, the program "Hi-Vision News" may be selected because it is on air at the air time of the program "TV Shopping", or the program "Hi-Vision News" may be selected because it accounts for a high percentage in the time slot of the program "TV Shopping". When the program "TV Shopping" is being received currently, a program being broadcast currently may be selected on the basis of the present time.

Each channel selection button ("ch→", "ch←") 24b allows the user to select a program on a channel adjacent to the channel having the program whose program in-depth information is being displayed currently. For example, when the "ch→" button is pushed on the screen shown in FIG. 4, the respective portions in the upper area 21 and the central area 22 are switched to the program in-depth information of the program "Hi-Vision News" or the program "Professional Baseball Relay" broadcast in the same time slot on the right adjacent Channel 16. When there are a plurality of programs in the same time slot as the program "News Evening", one of those programs is selected on the basis of a predetermined method of selection in the same manner as above.

When the adjacent channel has programs in a plurality of services, a program having a smaller service number is typically selected. Alternatively, one may be selected at random from a plurality of services, or may be selected on the basis of a past reception history. Also in such a case, one of those programs is selected on the basis of a predetermined method of selection.

Each time selection button ("time ↓", "time ↑") 24c allows the user to select a program in the temporal vicinity of the program whose program in-depth information is being displayed currently. For example, when the "time ↓" button is pushed on the screen shown in FIG. 4, the portions in the areas 21 and 22 are switched to the program in-depth information of the program "Friday Drama Theater", so that the program in-depth information of the program "Friday Drama Theater" is displayed.

Each previous-day/next-day program selection button ("previous day", "next day") 24d allows the user to select a program the same in time slot as the program whose program in-depth information is being displayed currently, but on air on the previous day or the next day. For example, when the "previous day" button is pushed on the screen shown in FIG. 4, the portions in the areas 21 and 22 are switched to the program in-depth information of a program to be broadcast in Service 123 on Channel 14 from 19 o'clock on the previous day, so that the program in-depth information of the selected program is displayed.

When there is no program whose air time is 19 o'clock on the previous day, a program which is on air at 19 o'clock may be selected, or a program whose air time is the closest to 19 o'clock may be selected. Also in this case, one program is selected on the basis of a predetermined method of selection.

Each previous-week/next-week program selection button ("previous week", "next week") 24e allows the user to select a program the same in time slot as the program whose program in-depth information is being displayed currently, but on air one week ago or later. For example, when the "next week" button is pushed on the screen shown in FIG. 4, the portions in the areas 21 and 22 are switched to the program in-depth information of a program to be broadcast in Service 123 on Channel 14 from 19 o'clock one week later, so that the program in-depth information of the selected program is displayed. In this case, when there is no program whose air time is 19 o'clock, one program is selected on the basis of a predetermined method of selection in the same manner as above.

The received program selection button ("now") 24f allows the user to select the program which is being received now. For example, when the "now" button is pushed on the screen shown in FIG. 4, the portions in the areas 21 and 22 are switched to the program in-depth information of the program which is being received now on the screen shown in FIG. 2, so that the program in-depth information of the selected program is displayed.

The next program selection button ("next") 24g allows the user to select a program following the program which is being received now. For example, when the "next" button is pushed on the screen shown in FIG. 4, the portions in the areas 21 and 22 are switched to the program in-depth information of a program following the program which is being received now on the screen shown in FIG. 2, so that the program in-depth information of the selected program is displayed. Assume that the program being received now is in the arrangement of one program on one channel, and the next program is in the arrangement of three programs of services (for example, the program being received is the program "○× Professional Golf Tour" in the program guide shown in FIG. 3). In this case, a program of service having a smaller service number may be selected. Also in this case, one of those programs is selected on the basis of a predetermined method of selection.

The recording-preselected program selection button ("recording-preselected") 24h allows the user to select a recording-preselected program. For example, when the "recording-preselected" button is pushed on the screen shown in FIG. 4, recording-preselected program information stored in the RAM 7 is read out. The program in-depth information of a program corresponding to the recording-preselected program is extracted from the program data stored in the RAM 7 to produce the program in-depth information. The portions in the upper area 21 and the central area 22 are switched to the program in-depth information of the recording-preselected program, so that the program in-depth information of the recording-preselected program is displayed.

The viewing-preselected program selection button ("viewing-preselected") 24i allows the user to select a viewing-preselected program. For example, when the "viewing-preselected" button is pushed on the screen shown in FIG. 4, viewing-preselected program information stored in the RAM 7 is read out. The program in-depth information of a program corresponding to the viewing-preselected program is extracted from the program data stored in the RAM 7 to produce the program in-depth information. The portions in the areas 21 and 22 are switched to the program in-depth information of the viewing-preselected program, so that the program in-depth information of the viewing-preselected program is displayed.

Incidentally, the recording-preselected program selection button 24h and the viewing-preselected program selection button 24i can change the selected recording-preselected or viewing-preselected program from among plurality of recording-preselected or viewing-preselected programs in order of preselection date and time. For example, when the button is pushed three times, the recording-preselected or viewing-preselected program the third closest to the present time is selected, and the program in-depth information of the recording-preselected or viewing-preselected program is displayed.

Figure 6:
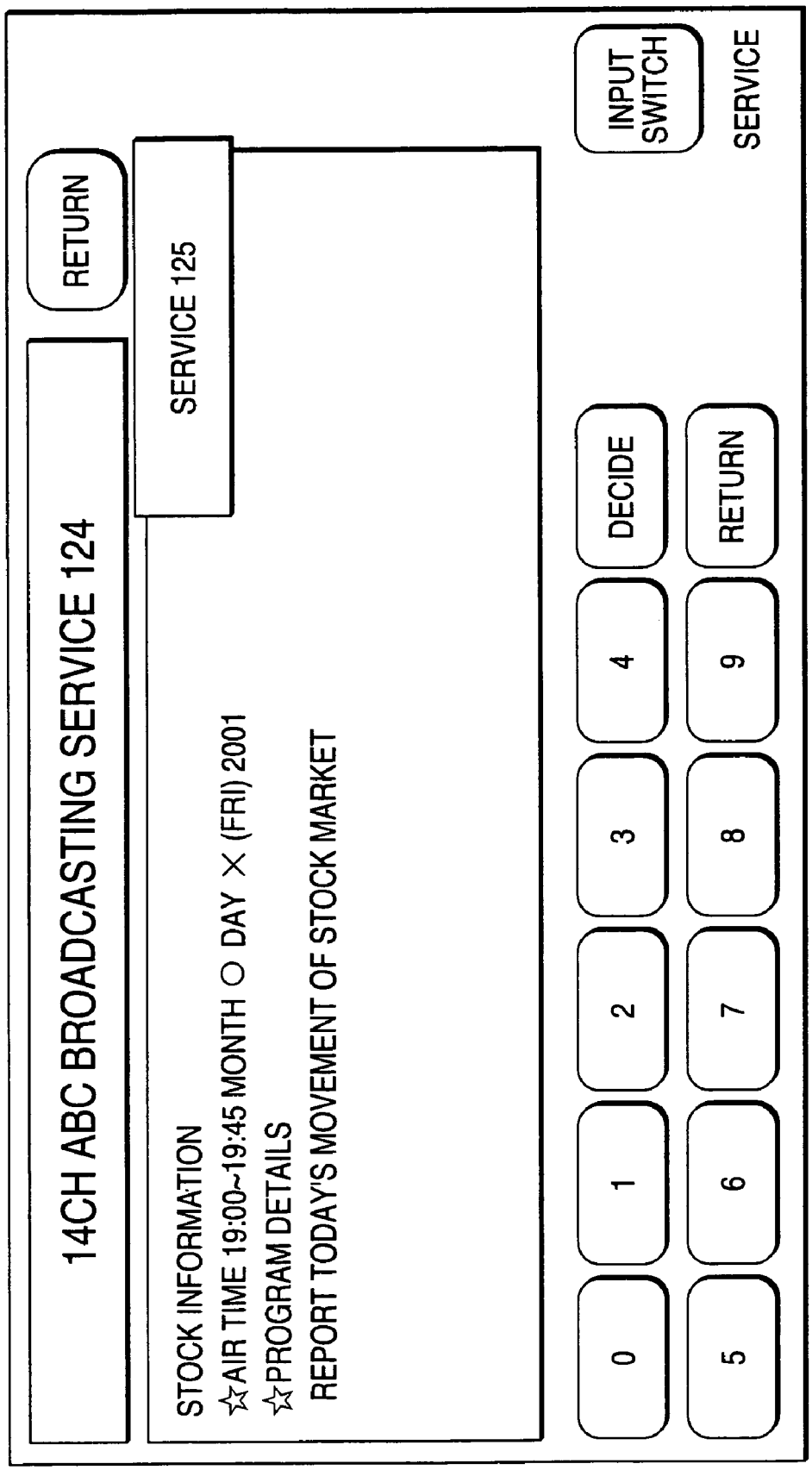
FIG. 6 is an explanatory view showing a display example of program in-depth information displayed on the display.

The program specific information input changeover button ("input switch") 24j is provided to change over the screen to a program specific information input screen for allowing the user to input the program specific information (a service number, a channel number, an air time, an out time, an air date, offset hours from displayed program, offset days from displayed program, offset hours from present time and offset days from present time). For example, when the "input switch" button is pushed on the screen shown in FIG. 4, the portion of a lower area 23 is changed over to a screen shown in FIG. 6 and the screen shown in FIG. 6 is displayed.

The portion of the lower area 23 includes 10 keys for directly inputting the service number, a "decide" button for deciding the input, a "return" button for returning to the previous screen (FIG. 4), and an "input switch" button for changing over to another category of program specific information. Incidentally, an acceptable category of the program specific information is displayed under the "input switch" button. Thus, the user can know the acceptable category of the program specific information. In addition, the input service number is displayed in the right upper portion of the central area 22.

Then, when a service number (e.g. 125) is input using the 10 keys and the "decide" button is pushed, the portions of the upper area 21 and the central area 22 are switched to the program in-depth information of a program ("TV Shopping") in Service 125 in the same time slot as the program "News Evening" whose program in-depth information is being displayed in FIG. 4, so that the program in-depth information of the selected program is displayed.

In addition, the program specific information input changeover button 24j can change over acceptable categories of the program specific information in turn. FIGS. 7A to 7E are partial views showing display examples of the lower area 23 to be changed over whenever the program specific information input changeover button 24j is pushed.

Figure 7A:
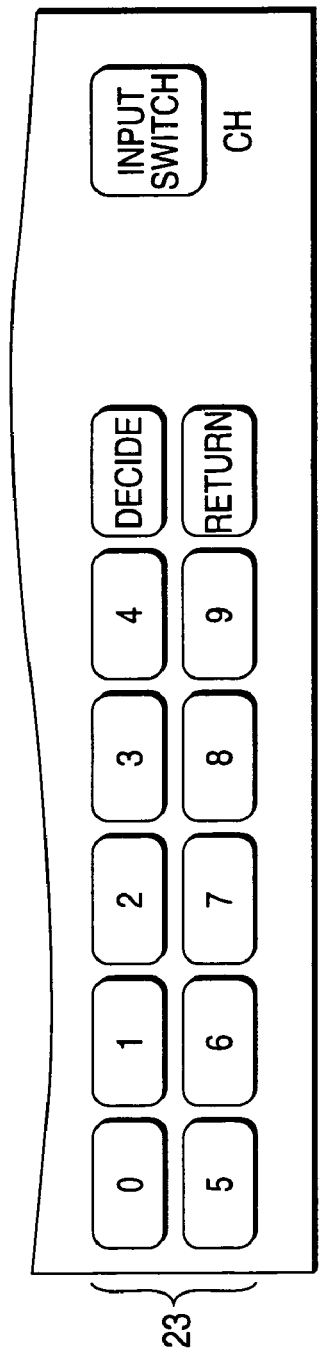

On the screen shown in FIG. 7A, a channel number can be input directly as the program specific information. Thus, the program in-depth information of a program on the channel having the specified channel number in the same time slot as the program whose program in-depth information is being displayed currently is displayed. Incidentally, when the channel having the specified channel number includes a plurality of services in the same time slot, and/or when the channel includes a plurality of programs in the same time slot, one program of them is selected in a predetermined method of selection in the same manner as above.

Figure 7B:
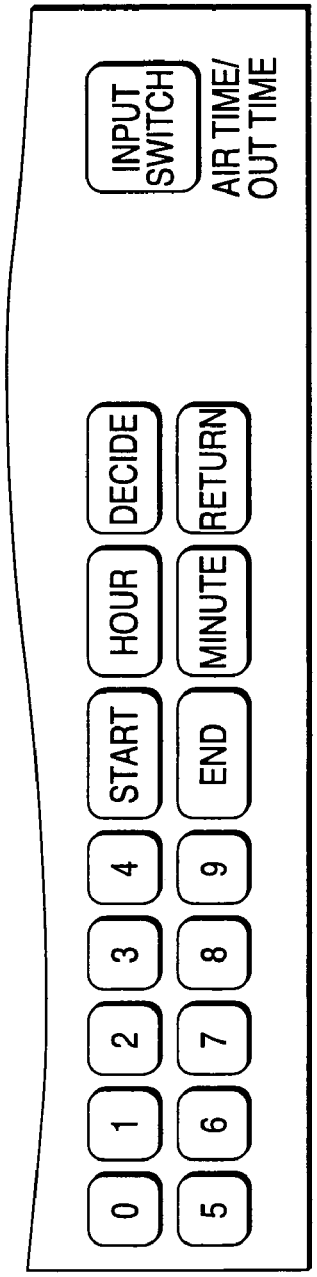

On the screen shown in FIG. 7B, an air time or an out time can be input directly as the program specific information. For example, when "Start Hour 21 Minute 00" is input by use of the displayed buttons and the "decide" button is pushed, the program in-depth information of a program started at 21:00 in the service to which the program whose program in-depth information is being displayed currently belongs is displayed.

Incidentally, there is no program started at 21:00 in the service, a program whose air time is the closest to 21:00 or a program which is on air at 21:00 is selected.

On the screen shown in FIG. 7C, an air date can be input directly as the program specific information. For example, assume that the program in-depth information of the program of "March 30, Channel 14, Service 125, Air Time 22:00" is being displayed in the areas 21 and 22 on the screen. In this case, when "Month 4 Date 1" is input as the air date by use of the displayed buttons in the area 23 and the "decide" button is pushed, the program in-depth information of a program of "April 1, Channel 14, Service 125, Air Time 22:00" is displayed. That is, the program in-depth information of a program on air on the input air date, in a service to which the program whose program in-depth information is being displayed currently belongs, and having the same air time as that of the program whose program in-depth information is being displayed currently, is displayed.

Incidentally, if there is no program having the same air time, a program whose air time is the closest or a program which is on air at the air time is displayed.

On the screen shown in FIG. 7D, offset hours or offset days from the air time of the program whose program in-depth information is being displayed currently can be input directly as the program specific information. For example, assume that the program in-depth information of the program of "March 30, Channel 14, Service 125, Air Time 19:00" is being displayed in the areas 21 and 22 on the screen. In this case, when "3 hours later" is input by use of the displayed buttons in the area 23 and the "decide" button is pushed, the program in-depth information of a program of "March 30, Channel 14, Service 125, Air Time 22:00" is displayed. That is, the program in-depth information of a program in a service to which the program whose program in-depth information is being displayed currently belongs, and having an air time after the offset hours or the offset days from the air time of the program whose program in-depth information is being displayed currently, is displayed.

Incidentally, if there is no program on air at a time after the input offset hours or the input offset days, a program whose air time is the closest to the time after input offset hours or the input offset days or a program which is on air at that time is displayed.

On the screen shown in FIG. 7E, offset hours or offset days from the present time can be input directly as the program specific information. For example, assume that the present time is 17:15 when the program in-depth information of the program of "March 30, Channel 16, Service 141, Air Time 18:30" is being displayed in the areas 21 and 22 on the screen. In this case, when "4 hours later" is input by use of the displayed buttons in the area 23 and the "decide" button is pushed, the program in-depth information of a program of "March 30, Channel 16, Service 141, Air Time 21:15" is displayed. That is, the program in-depth information of a program in a service to which the program whose program in-depth information is being displayed currently belongs, and having an air time after the offset hours or the offset days from the present time, is displayed.

Incidentally, if there is no program on air at a time after the input offset hours or the input offset days, a program whose air time is the closest to the time after input offset hours or the input offset days or a program which is on air at that time is displayed.

In addition, a plurality of pieces of program specific information can be input using the program specific information input changeover button 24j. For example, when the "decide" button is not pushed but the "input switch" button is pushed twice after a service number is input on the screen in FIG. 6, the screen is switched to the screen in FIG. 7B. On this screen, an air time is input, and the "decide" button is not pushed but the "input switch" button is pushed once. Thus, the screen is switched to the screen in FIG. 7C. On this screen, an air date is input, and the "decide" button is pushed here. In such a manner, the program in-depth information of a program meeting the three pieces of program specific information, that is, the service number, the air time and the air date, can be displayed.

Figure 8:
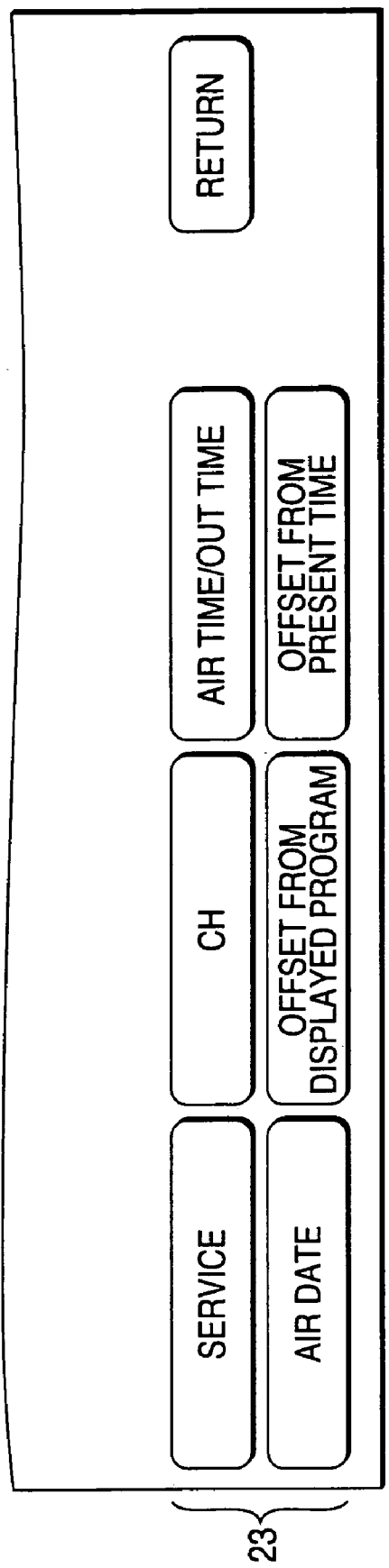
FIG. 8 is an explanatory view showing another display example of a program specific information input changeover screen displayed on the lower area of the display.

Although the program specific information input changeover button 24j can switch acceptable categories of program specific information in turn as shown in FIGS. 7A to 7E, it may adopt another configuration as follows. That is, as shown in FIG. 8, a list of acceptable categories of program specific information is first displayed when the program specific information input changeover button 24j is pushed. On that screen, a category of program specific information to be set is selected and input so that the screen is switched to a screen for inputting each piece of program specific information shown in FIGS. 7A-7E. Then, a corresponding piece of program specific information is input.

Figure 9:
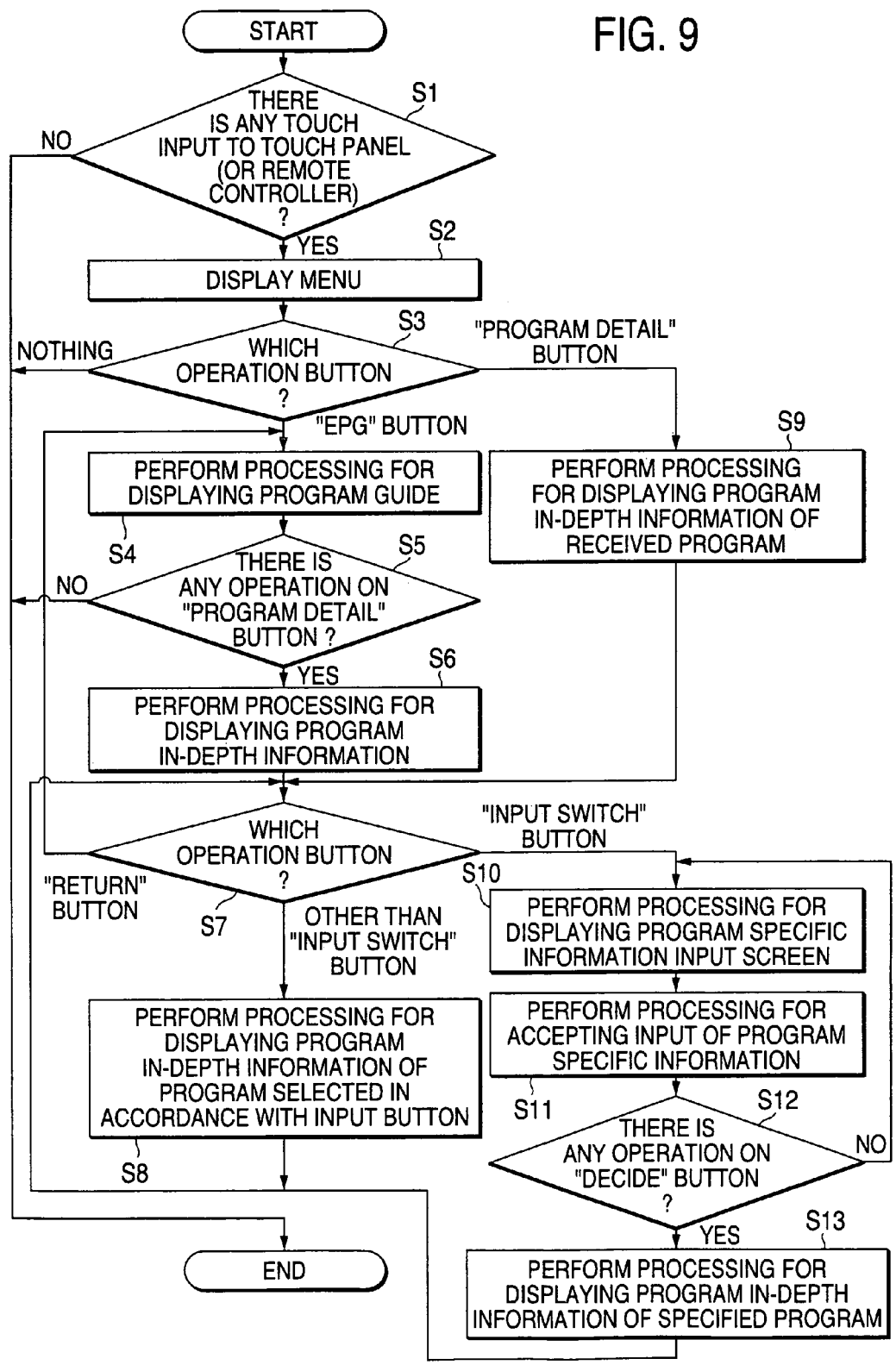
FIG. 9 is a flow chart showing the display processing operation to be executed by a CPU of the program information display apparatus according to Embodiment (1).

Next, the program in-depth information display processing operation to be executed by the CPU 9 in the program information display apparatus according to the embodiment (1) of the invention will be described with reference to the flow chart shown in FIG. 9.

First, in Step S1, it is judged whether a touch input to the touch panel 14 (or an input from the remote controller 15) has been detected or not. When it is concluded that a touch input to the touch panel 14 (or an input from the remote controller 15) has been detected, the routine of processing advances to Step S2.

In Step S2, processing (FIG. 2) for displaying the menu including the EPG button and the program detail button on a received program is performed. Then, the routine of processing advances to Step S3. In Step 3, it is judged which button has been pushed. When it is concluded that there is no button operation within a predetermined period, the menu display is deleted so that the received video screen is recovered. Then, the routine of processing is terminated.

On the contrary, when it is concluded in Step 3 that the pushed button is the "program detail" button, the routine of processing advances to Step S9. In Step S9, the following processing is performed. That is, program data of the program being received currently is extracted from the RAM 7 so as to create program in-depth information thereof, and the created program in-depth information is displayed on the display 13. After that, the routine of processing advances to Step S7.

On the other hand, it is concluded in Step 3 that the "EPG" button has been operated, the routine of processing then advances to Step S4. In Step S4, processing (FIG. 3) for displaying a program guide produced on the basis of the received program data is performed. After that, the routine of processing advances to Step S5.

In Step S5, a predetermined program space is selected, and it is judged whether the "program detail" button has been operated or not. When it is concluded that there is no operation on the "program detail" button, the routine of processing is terminated. On the contrary, when it is concluded in Step S5 that the "program detail" button has been operated, the routine of processing then advances to Step S6.

In Step S6, processing (FIG. 4) for displaying the program in-depth information (the areas 21 and 22 in FIG. 4) of the program selected in the program guide on the display 13, together with the program selection buttons 24 (the area 23 in FIG. 4) for allowing the user to select a program whose program in-depth information should be displayed, is performed. After that, the routine of processing advances to Step S7.

In Step S7, it is judged that which button of the displayed program selection buttons 24 (24a to 24j) and the "return" button for returning to the program guide has been pushed. When it is concluded that any program selection button 24 other than the program specific information input changeover button 24j has been operated, the routine of processing advances to Step S8.

In Step S8, the following processing is performed. That is, the program data of the program selected in accordance with the program selection button 24 (24a-24i) operated thus is extracted from the RAM 7, and the program in-depth information of the program is created and displayed on the display 13. After that, the routine of processing returns to Step S7.

On the other hand, when it is concluded in Step S7 that the program specific information input changeover button 24j has been operated, the routine of processing advances to Step S10. In Step S10, the following processing is performed. That is, a program specific information input screen selected in accordance with the number of times of pushing the program specific information input changeover button 24j is displayed in the area 23. After that, the routine of processing advances to Step S11.

In Step S11, processing for accepting an input of the selected category of program specific information is carried out. After that, the routine of processing advances to Step S12. In Step S12, it is judged whether the "decide" button has been operated or not. When it is concluded that there is no operation on the "decide" button, the routine of processing returns to Step S10. On the contrary, when it is concluded that the "decide" button has been operated, the routine of processing then advances to Step S13.

In Step S13, the following processing is carried out. That is, the program data of the program is extracted from the RAM 7 on the basis of the decided program specific information, and the program in-depth information of the program is created and displayed on the display 13. After that, the routine of processing returns to Step S7.

On the other hand, it is judged in Step S7 that the "return" button for returning to the program guide has been operated, the routine of processing returns to Step S4 in which the processing for displaying the program guide is carried out.

In the program information display apparatus according to the embodiment (1), the user can use any program selection button 24 (24a-24i) other than the program specific information input changeover button 24j so as to select a program, whose program in-depth information should be displayed, easily with at least one time of operation.

In addition, the user can use the program specific information input changeover button 24j so as to switch the screen to a screen for inputting program specific information. Thus, even when the number of times of operation increases by means of the program selection buttons 24 (24a-24g), the program specific information can be input directly. As a result, the number of times of operation for displaying the program in-depth information of a desired program can be reduced on a large scale. Thus, the operating property can be improved.

Particularly when program in-depth information is displayed on a small-size display mounted in a vehicle or the like, the troublesomeness of the operation for viewing the program in-depth information can be eliminated, so that movement of eyes of the driver from the front for each operation can be reduced. Accordingly, security can be improved.

Figure 10:
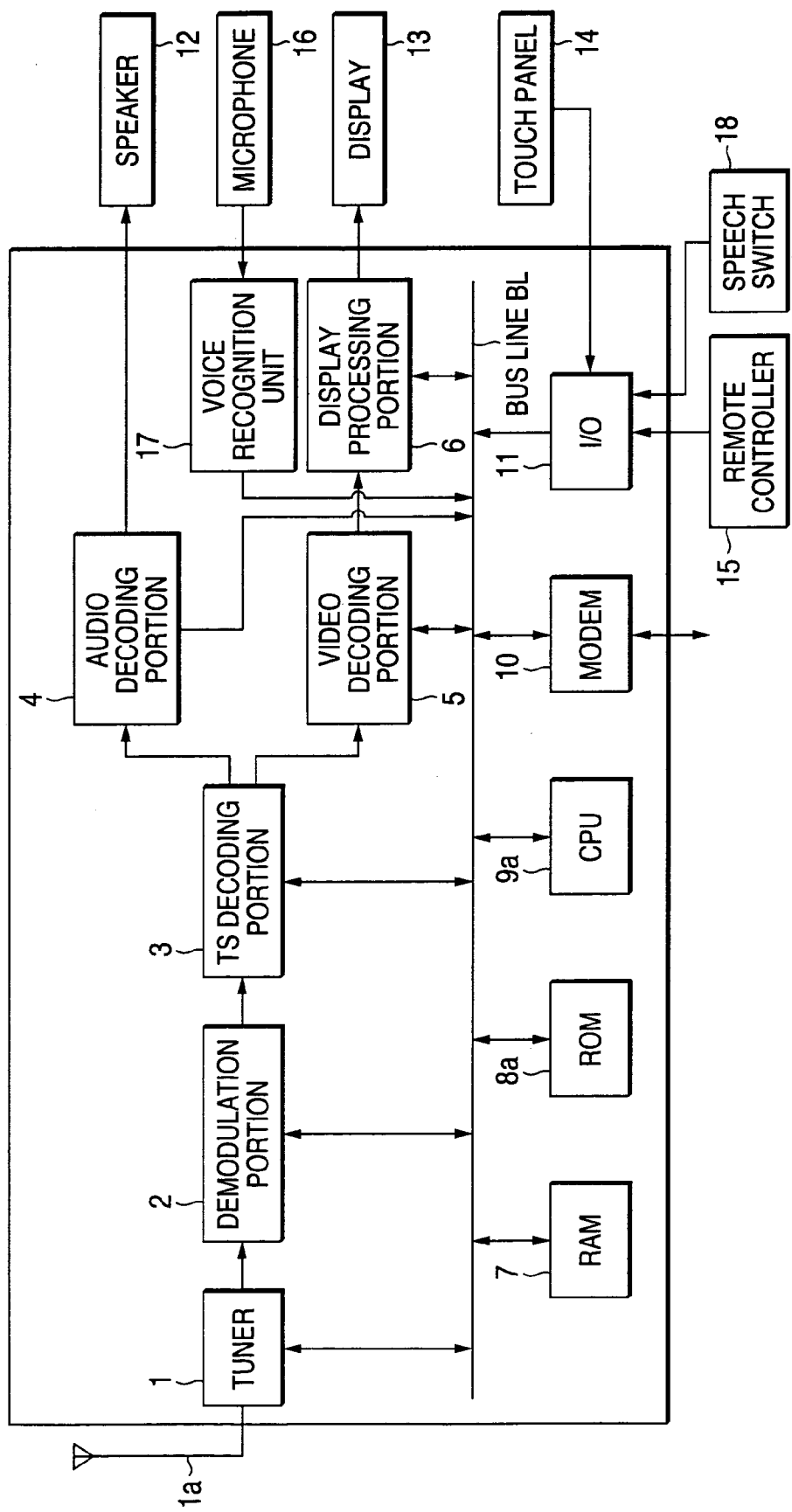
FIG. 10 is a block diagram schematically showing the main portion of a digital broadcasting receiver including program information display apparatus according to Embodiment (2) of the invention.

FIG. 10 is a block diagram schematically the main portion of an in-vehicle digital broadcasting receiver including program information display apparatus according to an embodiment (2) of the invention. Incidentally, constituent parts having the same functions as those in the digital broadcasting receiver shown in FIG. 1 are denoted by the same numerals correspondingly, and description thereof will be omitted.

The program information display apparatus according to the embodiment (2) is different from the program information display apparatus according to the embodiment (1) in the following point. That is, in the program information display apparatus according to the embodiment (1), the user uses the program selection buttons 24 (FIG. 4) displayed together with the program in-depth information of one program, so as to select another program whose program in-depth information should be displayed. On the other hand, in the program information display apparatus according to the embodiment (2), during the display of the program in-depth information of one program, the user can voice an utterance to select another program whose program in-depth information should be displayed.

A microphone 16 for inputting a voice is connected to the digital broadcasting receiver. The digital broadcasting receiver includes a voice recognition unit 17 for recognizing the voice input from the microphone 16.

In addition, a speech switch 18 for switching to a voice input mode is connected to an I/O 11. When the speech switch 18 is turned ON, the digital broadcasting receiver is controlled to be able to receive a voice input for a predetermined period.

The voice recognition unit 17 is controlled by a CPU 9a as follows. That is, the voice recognition unit 17 detects a voice section input through the microphone 16; performs processing for extracting (analyzing) acoustic feature parameters required for voice recognition from the input voice where the voice section has been detected; calculates the acoustic proximity of the input voice to each voice pattern prepared in advance for each voice unit; performs processing for efficiently searching (retrieving) the most suitable candidate as a recognition result of the input voice on the basis of recognized words registered in a word dictionary, or grammar in which connectivity among words has been defined; and outputs the recognition result.

In the CPU 9a, processing for checking the voice recognition result with a voice recognition operation table stored in a ROM 8a, which table will be described later. As a result of the checking, when there is a registered keyword corresponding to the voice recognition result, an operation to select a program associated with the registered keyword is carried out. That is, program in-depth information data of the selected program is extracted from the program data stored in a RAM 7, and supplied to a display processing portion 6 so that the program in-depth information of the selected program is displayed on a display 13.

The voice recognition operation table is stored in the ROM 8a. In the voice recognition operation table, program selection operation items for selecting a program whose program in-depth information should be displayed are associated with registered keywords to be checked with the voice recognition result.

FIG. 11 shows an example of the data structure of the voice recognition operation table. In the program selection operation items of FIG. 11, operation details substantially the same as the program selection buttons 24 shown in the lower area 23 in FIG. 4, or various direct operation details have been registered as items. Each registered keyword is registered in association with each registered program selection operation item. Incidentally, a plurality of registered keywords may be registered in association with the operation details of each program selection operation item.

In FIG. 11, for example, "previous service" is registered as a registered keyword in the program selection operation item "service backward rotation operation". When the voice recognition result obtained by the voice recognition unit 17 is "previous service", the service backward rotation operation is performed, that is, the program in-depth information of a program having a service number previous to the program whose program in-depth information is being displayed currently is selectively extracted from the program data in the RAM 7. Then, the display is switched to the program in-depth information of the program having the previous service number.

In addition, "service ooo" (o designates a desired digit) is registered as a registered keyword in the program selection operation item "service direct selection operation". For example, when the voice recognition result obtained by the voice recognition unit 17 is "Service 125", the program in-depth information of a program in "Service 125" is selectively extracted from the program data in the RAM 7. Then, the display is switched directly from the program in-depth information of the program being displayed currently to the program in-depth information of the program in "Service 125".

In addition, a word dictionary in which words, syllables or the like to be voice-recognized have been registered is stored in the ROM 8a. FIG. 12 shows an example of the data structure of the word dictionary.

Word dictionary data includes category items and registered word items. The registered words are classified into each category and stored for each category so as to support continuous voice recognition.

The category items are classified into categories such as a program selection category, a digit category, a unit category, an other-purpose category, etc. Words or the like for recognizing keywords for program selection, such as service, channel, recording, viewing, start, end, program, preselection, broadcasting, etc. are registered in the program selection category as shown in FIG. 12. Digits or the like for recognizing time, period, date, etc. are registered in the digit category likewise. Words indicating units for recognizing day, hour, minute, week, days later, hours later, minutes later, etc. are registered in the unit category likewise. Words or the like not falling into any other category are registered in the other-purpose category likewise. Since the registered words are classified into the categories in such a manner, it is not necessary to secure a very large memory capacity for the word dictionary. In addition, it becomes easy to combine words or the like grammatically. Thus, the word dictionary has a configuration suitable for continuous voice recognition.

Next, the method for displaying the program in-depth information to be displayed on the display 13 will be described. Incidentally, here, the method will be described with reference to the display examples described in the embodiment (1) as shown in FIGS. 3 to 5.

In addition, the display method as far as the screen for displaying the program in-depth information as shown in FIG. 4 is substantially the same as that in the embodiment (1), and the description of the method as far as that screen will be omitted here. Incidentally, although the program selection buttons 24 are displayed in the lower area 23 in FIG. 4 according to the embodiment (1), the program selection buttons 24 do not have to be displayed according to the embodiment (2). In order to notify the user of the details of voice recognition operation, however, the program selection buttons 24 may be displayed.

When the speech switch 18 is turned ON in the screen in which the program in-depth information has been displayed as shown in FIG. 4, the program information display apparatus enters the voice recognition mode. When the user utters "next service", the program in-depth information to be displayed is switched to the program in-depth information of the program "Stock Information" in Service 124 shown in FIG. 5. In addition, in the screen shown in FIG. 4, when the user utters "previous service" after the turning ON of the speech switch 18, the program in-depth information to be displayed is switched to the program in-depth information of the program in a service of a channel on the left side of Channel 14 in the program guide shown in FIG. 3.

In addition, when there are a plurality of programs in the time slot of the program whose program in-depth information is being displayed currently, processing similar to the processing described in the embodiment (1) is performed.

In addition, in the screen shown in FIG. 4, when the user utters "previous channel" after the turning ON of the speech switch 18, the portions in the areas 21 and 22 are switched to the program in-depth information of the program "Hi-Vision News" or the program "Professional Baseball Relay" to be broadcast on the right adjacent Channel 16 in the same time slot as the program whose program in-depth information is being displayed currently. Thus, the program in-depth information of the program "Hi-Vision News" or the program "Professional Baseball Relay" is displayed. On the other hand, when the user utters "next channel", the portions in the areas 21 and 22 are switched to the program in-depth information of a program to be broadcast on the left adjacent channel in the same time slot. Thus, the program in-depth information of the selected program is displayed.

In addition, in the screen shown in FIG. 4, when the user utters "previous program" after the turning ON of the speech switch 18, the portions in the areas 21 and 22 are switched to the program in-depth information of the previous program "ox Golf Tour". Thus, the program in-depth information of the previous program "ox Golf Tour" is displayed. On the other hand, when the user utters "next program", the portions in the areas 21 and 22 are switched to the program in-depth information of the next program "Friday Drama Theater". Thus, the program in-depth information of the next program "Friday Drama Theater" is displayed.

In addition, in the screen shown in FIG. 4, when the user utters "previous day" after the turning ON of the speech switch 18, the portions in the areas 21 and 22 are switched to the program in-depth information of a program to be started at 19 o'clock in Service 123 on Channel 14 the day before the program whose program in-depth information is being displayed currently. Thus, the program in-depth information of the selected program is displayed. Incidentally, there is no program to be started at 19 o'clock on the previous day, processing similar to that in the embodiment (1) is performed. On the other hand, when the user utters "next day", the portions in the areas 21 and 22 are switched to the program in-depth information of a program to be started at 19 o'clock in Service 123 on Channel 14 the day after the program whose program in-depth information is being displayed currently. Thus, the program in-depth information of the selected program is displayed.

In addition, in the screen shown in FIG. 4, when the user utters "previous week" after the turning ON of the speech switch 18, the portions in the areas 21 and 22 are switched to the program in-depth information of a program to be started at 19 o'clock in Service 123 on Channel 14 one week before the program whose program in-depth information is being displayed currently. Thus, the program in-depth information of the selected program is displayed. Incidentally, there is no program to be started at 19 o'clock, processing similar to that in the description of the embodiment (1) is performed. On the other hand, when the user utters "next week", the portions in the areas 21 and 22 are switched to the program in-depth information of a program to be started at 19 o'clock in Service 123 on Channel 14 the week after the program whose program in-depth information is being displayed currently. Thus, the program in-depth information of the selected program is displayed.

In addition, in the screen shown in FIG. 4, when the user utters "program viewed now" after the turning ON of the speech switch 18, the portions in the areas 21 and 22 are switched to the program in-depth information of the program being received currently on the screen shown in FIG. 2. Thus, the program in-depth information of the program being received currently is displayed. On the other hand, when the user utters "next to the program viewed now", the portions in the areas 21 and 22 are switched to the program in-depth information of a program following the program being received currently on the screen shown in FIG. 2. Thus, the program in-depth information of the selected program is displayed.

In addition, in the screen shown in FIG. 4, when the user utters "viewing-preselected program" after the turning ON of the speech switch 18, the portions in the areas 21 and 22 are switched to the program in-depth information of a viewing-preselected program. Thus, the program in-depth information of the viewing-preselected program is displayed. On the other hand, when the user utters "recording-preselected program", the portions in the areas 21 and 22 are switched to the program in-depth information of a recording-preselected program. Thus, the program in-depth information of the recording-preselected program is displayed.

In addition, in the screen shown in FIG. 4, assume that any service number uttered by the user is set to be able to be voice-recognized. In this case, when the user utters "Service 125" after the turning ON of the speech switch 18, the portions in the areas 21 and 22 are switched directly to the program in-depth information of a program ("TV Shopping") in Service 125 in the same time slot as the program "News Evening" whose program in-depth information is being displayed in FIG. 4. Thus, the program in-depth information of the selected program is displayed.

In addition, in the screen shown in FIG. 4, assume that any channel number uttered by the user is set to be able to be voice-recognized. In this case, when the user utters "Channel 23" after the turning ON of the speech switch 18, the portions in the areas 21 and 22 are switched directly to the program in-depth information of a program on Channel 23 in the same time slot as the program "News Evening" whose program in-depth information is being displayed in FIG. 4. Thus, the program in-depth information of the selected program on Channel 23 is displayed.

In addition, in the screen shown in FIG. 4, assume that any air time uttered by the user is set to be able to be voice-recognized. In this case, when the user utters "air time 6:45" after the turning ON of the speech switch 18, the portions in the areas 21 and 22 are switched directly to the program in-depth information of a program to be started at 6:45 in the service (Service 123 in the case of FIG. 4) the program whose program in-depth information is being displayed currently belongs to. Thus, the program in-depth information of the program to be started at 6:45 in the service is displayed.

Incidentally, if there is no program to be started at 6:45 in the service, a program whose air time is the closest to 6:45 or a program which is on air at 6:45 is selected.

In addition, in the screen shown in FIG. 4, assume that any out time uttered by the user is set to be able to be voice-recognized. In this case, when the user utters "out time 8:50" after the turning ON of the speech switch 18, the portions in the areas 21 and 22 are switched directly to the program in-depth information of a program to be ended at 8:50 in the service (Service 123 in the case of FIG. 4) the program whose program in-depth information is being displayed currently belongs to. Thus, the program in-depth information of the program to be ended at 8:50 in the service is displayed.

Incidentally, if there is no program to be ended at 8:50 in the service, a program whose out time is the closest to 8:50 or a program which is on air at 8:50 is selected.

In addition, in the screen shown in FIG. 4, assume that any air date uttered by the user is set to be able to be voice-recognized, and assume that the program in-depth information of the program of "March 30, Channel 14, Service 123, Air Time 19:00" is being displayed in the areas 21 and 22 on the screen. In this case, when the user utters "air date April 3" after the turning ON of the speech switch 18, the portions in the areas 21 and 22 are switched directly to the program in-depth information of the program of "April 3, Channel 14, Service 123, Air Time 19:00". Thus, the program in-depth information of the program of "April 3, Channel 14, Service 123, Air Time 19:00" is displayed. Incidentally, if there is no program having the same air time, a program whose air time is the closest to the aimed air time or a program which is on air at that time is selected.

In addition, in the screen shown in FIG. 4, assume that offset hours or offset days which are uttered by the user and which are offset from the air time of the program whose program in-depth information is being displayed currently are set to be able to be voice-recognized. For example, assume that the program in-depth information of the program of "March 30, Channel 14, Service 123, Air Time 19:00" is being displayed in the areas 21 and 22 on the screen. In this case, when the user utters "3 hours later than this program" after the turning ON of the speech switch 18, the portions in the areas 21 and 22 are switched directly to the program in-depth information of the program of "March 30, Channel 14, Service 123, Air Time 22:00". Thus, the program in-depth information of the program of "March 30, Channel 14, Service 123, Air Time 22:00" is displayed. On the other hand, when the user utters "5 days later than this program" after the turning ON of the speech switch 18, the display is switched directly to the program in-depth information of the program of "April 4, Channel 14, Service 123, Air Time 19:00". Incidentally, if there is no program to be broadcast after the offset hours or the offset days uttered by the user, a program whose air time is the closest to the time after the offset hours or the offset days uttered by the user or a program which is on air at that time is selected.

In addition, in the screen shown in FIG. 4, assume that offset hours or offset days which are uttered by the user and which are offset from the present time are set to be able to be voice-recognized. For example, assume that the program in-depth information of the program of "March 30, Channel 14, Service 123, Air Time 19:00" is being displayed in the areas 21 and 22 on the screen, and the present time is 17:15 on March 30. In this case, when the user utters "4 hours later from now on" after the turning ON of the speech switch 18, the display is switched directly to the program in-depth information of the program of "March 30, Channel 14, Service 123, Air Time 21:15". On the other hand, when the user utters "3 days later from now on" after the turning ON of the speech switch 18, the display is switched directly to the program in-depth information of the program of "April 2, Channel 14, Service 123, Air Time 17:15". Incidentally, if there is no program to be broadcast after the offset hours or the offset days uttered by the user, a program whose air time is the closest to the time after the offset hours or the offset days uttered by the user or a program which is on air at that time is selected.

Next, the program in-depth information display processing operation to be executed by the CPU 9*a* in the program information display apparatus according to the embodiment (2) will be described with reference to the flow chart shown in FIG. 13. Incidentally, here, description will be made about processing after the processing for displaying the program in-depth information has been performed on the program guide screen or the menu screen.

First, in Step S21, it is judged whether the speech switch 18 has been turned ON or not. When it is concluded that the speech switch 18 has been turned ON, the routine of processing advances to Step S22. On the contrary, when it is concluded that the speech switch 18 has not been turned ON, the routine of processing returns to Step S21.

In Step S22, processing for importing an input voice is performed. After that, the routine of processing advances to Step S23. In Step 23, voice-recognition processing is performed on the input voice. Then, the routine of processing advances to Step S24. In Step S24, processing for checking the voice recognition result with the voice recognition operation table is performed. Then, the routine of processing advances to Step S25.

In Step S25, it is judged whether there is a registered keyword compatible with the voice recognition result or not. When it is concluded that there is a registered keyword compatible with the voice recognition result, the routine of processing advances to Step S26. On the contrary, when it is concluded that there is no registered keyword compatible with the voice recognition result, the routine of processing is terminated.

In Step S26, processing for carrying out a program selection operation associated with the registered keyword is performed. After that, the routine of processing advances to Step S27.

In Step S27, the following processing is performed. That is, program data of the selected program is extracted from the RAM 7 so as to create program in-depth information thereof, and the created program in-depth information is displayed on the display 13. After that, the routine of processing is terminated.

In the program information display apparatus according to the embodiment (2), an utterance voiced by the user during the display of the program in-depth information of one program can be recognized so that a program selection operation associated with a registered keyword based on the voice recognition result can be performed. Thus, the program in-depth information of another desired program can be displayed easily. Accordingly, the user can make the program information display apparatus display the program in-depth information of the program without operating any button or the like. Thus, the operating property can be improved more greatly.

In addition, program specific information (service number, channel number, air time, out time, air date, offset hours/offset days from displayed program, and offset hours/offset days from present time) can be recognized by the voice recognition unit 17. Accordingly, when the program specific information is input by voice, the program in-depth information of a program corresponding to the voice-recognized program specific information can be displayed directly. Thus, the user-friendliness can be further improved.

Incidentally, the program information display apparatus is applied to an in-vehicle digital broadcasting receiver in the aforementioned embodiments. However, the apparatus is not limited to the in-vehicle purpose, but it is also applicable to a home digital broadcasting receiver or a home digital broadcasting TV set. In that case, the operating property can be improved similarly.

What is claimed is:

1. A program information display apparatus comprising:
a receiver operable to receive program data of digital broadcasting;
a first creating section operable to create an electronic programming guide (EPG) including a schedule of a plurality of TV programs based on the received program data;
a second creating section operable to create a description regarding one of the TV programs based on the received program data; and
a display section operable to control a display having a screen,
wherein the display section controls the display to display the EPG on the screen in response to an instruction by a user;
wherein the display section controls the display to display the description regarding the one of the TV programs on the screen in place of the EPG when the user selects the one of the TV programs from the EPG; and
wherein the display section controls the display to display another description regarding another of the TV programs on the screen in place of the description regarding the one of the TV programs when the user selects the other of the TV programs while the description regarding the one of the TV programs is displayed on the screen.

2. The program information display apparatus according to claim 1, further comprising:
an input unit allowing the user to select the other of the TV programs while the description regarding the one of the TV programs is displayed on the screen,
wherein the input unit includes a service selection input unit for allowing the user to select a TV program in a service adjacent to a service having the other TV program when one channel includes a plurality of services for programs.

3. The program information display apparatus according to claim 1, further comprising:
an input unit allowing the user to select the other of the TV programs while the description regarding the one of the TV programs is displayed on the screen,
wherein the input unit includes a channel selection input unit for allowing the user to select a TV program on a channel adjacent to a channel having the other TV program.

4. The program information display apparatus according to claim 1, further comprising:
an input unit allowing the user to select the other of the TV programs while the description regarding the one of the TV programs is displayed on the screen,
wherein the input unit includes at least one of:
a previous time selection input unit for allowing the user to select a TV program in a previous time of the other TV program; and
a following time selection input unit for allowing the user to select a program in a following time of the other program.

5. The program information display apparatus according to claim 1, further comprising:
an input unit allowing the user to select the other of the TV programs while the description regarding the one of the TV programs is displayed on the screen,
wherein the input unit includes at least one of:
a previous-day program selection input unit for allowing the user to select a TV program the same in time slot as the other TV program, but on air on previous day; and
a next-day program selection input unit for allowing the user to select a TV program the same in time slot as the other TV program, but on air on next day.

6. The program information display apparatus according to claim 1, further comprising:
an input unit allowing the user to select the other of the TV programs while the description regarding the one of the TV programs is displayed on the screen,
wherein the input unit includes at least one of:
a previous week program selection input unit for allowing the user to select a TV program the same in time slot as the other TV program, but on air in previous week; and
a next week program selection input unit for allowing the user to select a TV program the same in time slot as the other TV program, but on air in next week.

7. The program information display apparatus according to claim 1, further comprising:
an input unit allowing the user to select the other of the TV programs while the description regarding the one of the TV programs is displayed on the screen,
wherein the input unit includes a received program selection input unit for allowing the user to select the other TV program.

8. The program information display apparatus according to claim 1, further comprising:

an input unit allowing the user to select the other of the TV programs while the description regarding the one of the TV programs is displayed on the screen, wherein the input unit includes a next program selection input unit for allowing the user to select a TV program following the other TV program.

9. The program information display apparatus according to claim 1, further comprising:

an input unit allowing the user to select the other of the TV programs while the description regarding the one of the TV programs is displayed on the screen, wherein the input unit includes a recording-preselected program selection input unit for allowing the user to select a recording-preselected TV program.

10. The program information display apparatus according to claim 9, wherein:

the recording-preselected program selection input unit is operable to change the selected recording-preselected TV program from among a plurality of recording-preselected TV programs in order of preselection date and time.

11. The program information display apparatus according to claim 1, further comprising:

an input unit allowing the user to select the other of the TV programs while the description regarding the one of the TV programs is displayed on the screen, wherein the input unit includes a viewing-preselected program selection input unit for allowing the user to select a viewing-preselected program.

12. The program information display apparatus according to claim 11, wherein:

the viewing-preselected program selection input unit is operable to change the selected viewing-preselected TV program from among a plurality of viewing-preselected TV programs in order of preselection date and time.

13. The program information display apparatus according to claim 1, further comprising:

an input unit allowing the user to select the other of the TV programs while the description regarding the one of the TV programs is displayed on the screen, wherein the input unit includes a program specific information input screen changeover unit for changing over to a screen for allowing the user to input program specific information.

14. The program information display apparatus according to claim 13, wherein:

the program specific information input screen changeover unit can change over acceptable pieces of the program specific information in turn.

15. The program information display apparatus according to claim 13, wherein:

the program specific information input screen changeover unit can display a list of acceptable pieces of the program specific information.

16. The program information display apparatus according to claim 13, wherein:

the program specific information includes at least one of offset hours and offset days from an air time of the other program.

17. The program information display apparatus according to claim 13, wherein:

the program specific information includes at least one of offset hours and offset days from a present time.

18. The program information display apparatus according to claim 1, further comprising:

an input unit allowing the user to select the other of the TV programs while the description regarding the one of the TV programs is displayed on the screen, wherein the input unit includes a voice recognition unit; and wherein a TV program corresponding to program specific information recognized by the voice recognition unit is selected as the other of the TV programs.

19. The program information display apparatus according to claim 18, wherein:

the program specific information includes a keyword.

20. The program information display apparatus according to claim 18, wherein:

the program specific information includes a service number.

21. The program information display apparatus according to claim 18, wherein:

the program specific information includes a channel number.

22. The program information display apparatus according to claim 18, wherein:

the program specific information includes on-air date and time information.

23. The program information display apparatus according to claim 18, wherein:

the program specific information includes at least one of offset hours and offset days from an air time of the other of the TV programs.

24. The program information display apparatus according to claim 18, wherein:

the program specific information includes at least one of offset hours and offset days from a present time.

25. A program information display method, comprising:

receiving program data of digital broadcasting;

creating an electronic programming guide (EPG) including a schedule of a plurality of TV programs based on the received program data and displaying the EPG on a screen in response to an instruction by a user;

creating a description regarding one of the TV programs based on the received program data and displaying the description on the screen in place of the EPG when a user selects the one of the TV programs from the EPG; and creating another description regarding another of the TV programs based on the received program data and displaying the another description on the screen in place of the description regarding the one of the TV programs when the user selects the other of the TV programs while the description regarding the one of the TV programs is displayed on the screen.

* * * * *